(12) United States Patent
Agrawal et al.

(10) Patent No.: US 12,554,250 B2
(45) Date of Patent: Feb. 17, 2026

(54) HAPTIC PROFILES FOR INPUT CONTROLS OF A COMPUTER-ASSISTED DEVICE

(71) Applicant: INTUITIVE SURGICAL OPERATIONS, INC., Sunnyvale, CA (US)

(72) Inventors: Varun Agrawal, Mountain View, CA (US); Hsien-Hsin Liao, Sunnyvale, CA (US); Angel Jeremy Perez Rosillo, San Francisco, CA (US); Korissa A. Reyes, Edmonds, WA (US); Lawton N. Verner, Saratoga, CA (US); Keith J. Watza, Boulder, CO (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 345 days.

(21) Appl. No.: 18/254,963

(22) PCT Filed: Nov. 30, 2021

(86) PCT No.: PCT/US2021/061230
§ 371 (c)(1),
(2) Date: May 30, 2023

(87) PCT Pub. No.: WO2022/115793
PCT Pub. Date: Jun. 2, 2022

(65) Prior Publication Data
US 2024/0004369 A1  Jan. 4, 2024

Related U.S. Application Data

(60) Provisional application No. 63/119,599, filed on Nov. 30, 2020.

(51) Int. Cl.
*G05B 19/4155* (2006.01)
*A61B 18/00* (2006.01)
(Continued)

(52) U.S. Cl.
CPC ...... *G05B 19/4155* (2013.01); *A61B 18/1442* (2013.01); *A61B 34/30* (2016.02);
(Continued)

(58) Field of Classification Search
CPC ......... A61B 34/37; A61B 34/74; A61B 34/76; A61B 18/1442; A61B 2018/00589;
(Continued)

(56) References Cited

U.S. PATENT DOCUMENTS 8,521,331 B2  8/2013  Itkowitz
8,543,240 B2  9/2013  Itkowitz et al.
(Continued)

FOREIGN PATENT DOCUMENTS

WO  WO-2018012227 A1  1/2018
WO  WO-2019126370 A1  6/2019

OTHER PUBLICATIONS

International Preliminary Report on Patentability for Application No. PCT/US2021/061230 mailed Jun. 15, 2023, 13 pages.
(Continued)

*Primary Examiner* — Linda C Dvorak
(74) *Attorney, Agent, or Firm* — Artegis Law Group, LLP

(57) ABSTRACT

Systems and methods of providing a haptic barrier for an instrument include a computer-assisted device. The computer-assisted device includes a grip input control, a repositionable arm configured to support an instrument, and one or more processors. The one or more processors are configured to detect a position of the grip input control in a first direction of a degree of freedom having In a first region, a second region, and a third region between the first and second regions; in response to determining that the detected position is in the first region, operate the instrument according to a first mode; in response to determining that the detected position is in the third region, provide a haptic
(Continued)

barrier to resist movement of the grip input control through the third region; and in response to determining that the detected position is in the second region, operate the instrument according to a second mode.

20 Claims, 21 Drawing Sheets

(51) Int. Cl.
*A61B 18/14* (2006.01)
*A61B 34/00* (2016.01)
*A61B 34/30* (2016.01)
*B25J 9/16* (2006.01)
*B25J 13/02* (2006.01)

(52) U.S. Cl.
CPC ............. *A61B 34/76* (2016.02); *B25J 9/1689* (2013.01); *B25J 13/025* (2013.01); *A61B 2018/00589* (2013.01); *A61B 2018/00595* (2013.01); *A61B 2018/0063* (2013.01); *G05B 2219/40415* (2013.01)

(58) Field of Classification Search
CPC .. A61B 2018/0063; A61B 2018/00297; A61B 34/25; A61B 2090/061; A61B 2090/067; B25J 13/025; B25J 13/086
USPC ......................................................... 606/49
See application file for complete search history.

(56) References Cited

U.S. PATENT DOCUMENTS

| | | | |
|---|---|---|---|
| 9,050,120 | B2 | 6/2015 | Swarup et al. |
| 10,524,870 | B2 | 1/2020 | Saraliev et al. |
| 10,835,332 | B2 | 11/2020 | Manzo et al. |
| 2010/0161129 | A1 | 6/2010 | Costa et al. |
| 2014/0276938 | A1 | 9/2014 | Hsu et al. |
| 2017/0086876 | A1 | 3/2017 | Wiener et al. |
| 2018/0243908 | A1 | 8/2018 | Tojo et al. |
| 2018/0256271 | A1 | 9/2018 | Tojo |
| 2019/0187741 | A1* | 6/2019 | Walters ................... G05G 1/01 |
| 2019/0314097 | A1* | 10/2019 | Diolaiti .................. A61B 34/37 |
| 2020/0015917 | A1 | 1/2020 | Cavalier et al. |
| 2020/0170733 | A1 | 6/2020 | Peine |
| 2021/0177495 | A1 | 6/2021 | Ross et al. |

OTHER PUBLICATIONS

International Search Report and Written Opinion for Application No. PCT/US2021/061230, mailed May 17, 2022, 20 pages.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

HAPTIC PROFILES FOR INPUT CONTROLS OF A COMPUTER-ASSISTED DEVICE

CROSS-REFERENCE TO RELATED APPLICATIONS

This application is a U.S. National Stage patent application of International Patent Application No. PCT/US2021/061230, filed Nov. 30, 2021, and claims the benefit of the U.S. Provisional Application titled "HAPTIC BARRIER TO INDICATE OPERATION MODES OF A COMPUTER-ASSISTED INSTRUMENT," filed on Nov. 30, 2020, and having Ser. No. 63/119,599. The subject matter of each of these applications is hereby incorporated by reference herein in its entirety.

BACKGROUND

Field of the Various Embodiments

The present disclosure relates generally to operation of computer-assisted instruments and more particularly to haptic profiles for input controls of computer-assisted devices.

Description of the Related Art

More and more devices are being replaced with computer-assisted electronic devices. This is especially true in industrial, entertainment, educational, and other settings. As a medical example, the hospitals of today include large arrays of electronic devices being found in operating rooms, interventional suites, intensive care wards, emergency rooms, and/or the like. For example, glass and mercury thermometers are being replaced with electronic thermometers, intravenous drip lines now include electronic monitors and flow regulators, and traditional hand-held surgical and other medical instruments are being replaced by computer-assisted medical devices.

These computer-assisted devices are useful for performing operations and/or procedures on materials, such as the tissue of a patient. With many computer-assisted devices, an operator, such as a surgeon and/or other medical personnel, may typically manipulate input devices using one or more controls on an operator console. As the operator operates the various controls at the operator console, the commands are relayed from the operator console to a computer-assisted device located in a workspace where they are used to position and/or actuate one or more end effectors and/or tools that are mounted (e.g., via repositionable arms) to the computer-assisted device. In this way, the operator is able to perform one or more procedures on material in the workspace using the end effectors and/or tools.

The controls used by the operator to manipulate end effectors and/or tools can include a grip input control. The operator can apply or release force and/or torque on the grip input control to close or open, respectively, the grip input control. The end effector and/or tool can perform a function based on the amount of closure, force, and or torque applied to the grip input control. A grip input control can include a spring mechanism to regulate the amount of force or torque needed to close the grip input control and/or to return the grip input control to an open position when force or torque applied to the grip input control is below the resistance provided by the spring mechanism.

Because of the remote nature of the operation of computer-assisted end effectors and/or tools via a grip input control, it may be difficult in some cases for the operator to directly monitor the end effector and/or tool, and/or the how the end effector and/or tool is affecting the material. For example, a non-computer-assisted end effector can provide mechanically implemented physical feedback to the operator based on the operation of the end effector, such as by indicating the amount of resistance when attempting to grasp a material grasped by the end effector. Computer-assisted end effectors and/or tools controlled via a grip input control do not provide such physical feedback to the operator at the grip input control, hindering the ability of the operator to monitor the end effector and/or tool, and/or the effect of the end effector and/or tool on the material. Accordingly, the situational awareness of the operator when using the computer-assisted end effector and/or tool is reduced.

Accordingly, improved methods and systems for the operation of computer-assisted devices, such as computer-assisted devices having end effectors and/or tools controlled via a grip input control, are desirable. In some examples, it may be desirable to provide physical feedback to the operator at the grip input control regarding how the grip input control is affecting functionality of the end effector and/or tool, so as to help ensure that the end effector and/or tool may be able to successfully perform a desired procedure on the material.

SUMMARY

According to some embodiments, a computer-assisted device comprises a grip input control, a repositionable arm configured to support an instrument, and one or more processors configured to detect a position of the grip input control in a first direction of a degree of freedom of the grip input control, the degree of freedom having a first region, a second region, and a third region between the first region and the second region; in response to determining that the detected position is in the first region, operate the instrument according to a first mode; in response to determining that the detected position is in the third region, provide a haptic barrier to resist movement of the grip input control through the third region; and in response to determining that the detected position is in the second region, operate the instrument according to a second mode different from the first mode.

According to some embodiments, a method comprises detecting a position of a grip input control in a first direction of a degree of freedom of the grip input control, the degree of freedom having a first region, a second region, and a third region between the first region and the second region; in response to determining that the detected position is in the first region, operating an instrument supported on a repositionable arm according to a first mode; in response to determining that the detected position is in the third region, providing a haptic barrier to resist movement of the grip input control through the third region; and in response to determining that the detected position is in the second region, operating the instrument according to a second mode different from the first mode.

According to some embodiments, a computer-assisted device comprises an input control, and one or more processors configured to detect a position of the input control in a first direction of a first degree of freedom of the input control; in response to determining that the detected position is in a first region in the first direction of the first degree of freedom of the input control, provide a first output force or torque to resist movement of the input control to a first position in the first region; in response to determining that the detected position of the input control is the first position in the first region, restrict movement of the input control along the first degree of freedom away from the first position in the first region; in response to determining that the detected position is in a second region in the first direction of the first degree of freedom of the input control, provide a second output force or torque to resist movement of the input control to a second position in the second region, wherein the second output force or torque is larger than the first output force or torque; and in response to determining that the detected position of the input control is the second position in the second region, restrict movement of the input control along the first degree of freedom away from the second position of the input control.

According to some embodiments, a method comprises detecting a position of an input control in a first direction of a first degree of freedom of the input control; in response to determining that the detected position is in a first region in the first direction of the first degree of freedom of the input control, providing a first output force or torque to resist movement of the input control to a first position in the first region; in response to determining that the detected position of the input control is the first position in the first region, restricting movement of the input control along the first degree of freedom away from the first position in the first region; in response to determining that the detected position is in a second region in the first direction of the first degree of freedom of the input control, providing a second output force or torque to resist movement of the input control to a second position in the second region, wherein the second output force or torque is larger than the first output force or torque; and in response to determining that the detected position of the input control is the second position in the second region, restricting movement of the input control along the first degree of freedom away from the second position of the input control.

According to some embodiments, a computer-assisted device comprises an input control, and one or more processors configured to detect a position of the input control; in response to determining that the detected position is in a first region along a first degree of freedom of the input control, apply a first force or torque to the input control based on a haptic profile; and based on an amount of time that the detected position is in the first region, modify one or more properties of the haptic profile.

According to some embodiments, a method comprises detecting a position of an input control; in response to determining that the detected position is in a first region along a first degree of freedom of the input control, applying a first force or torque to the input control based on a haptic profile; and based on an amount of time that the detected position is in the first region, modifying one or more properties of the haptic profile.

Consistent with some embodiments, one or more non-transitory machine-readable media including a plurality of machine-readable instructions which when executed by one or more processors are adapted to cause the one or more processors to perform any of the methods described herein.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
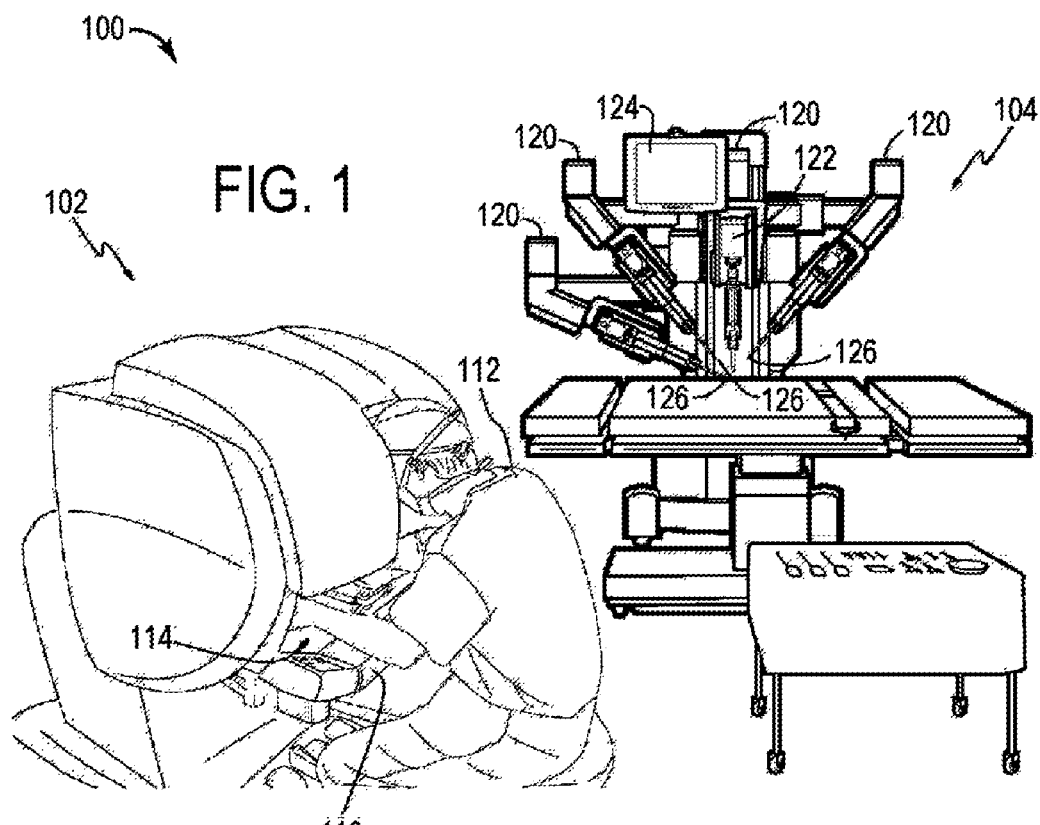
FIG. 1 is a diagrammatic illustration of a teleoperated surgical system, according to some embodiments.

This description and the accompanying drawings that illustrate inventive aspects, embodiments, embodiments, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, this description's terminology is not intended to limit the invention. For example, spatially relative terms-such as "beneath", "below", "lower", "above", "upper", "proximal", "distal", and the like-may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes include various special element positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, embodiment, or module may, whenever practical, be included in other embodiments, embodiments, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, embodiment, or application may be incorporated into other embodiments, embodiments, or aspects unless specifically described otherwise, unless the one or more elements would make an embodiment or embodiment non-functional, or unless two or more of the elements provide conflicting functions.

In some instances, well known methods, procedures, components, and circuits have not been described in detail so as not to unnecessarily obscure aspects of the embodiments.

This disclosure describes various devices, elements, and portions of computer-assisted devices and elements in terms of their state in three-dimensional space. As used herein, the term "position" refers to the location of an element or a portion of an element in a three-dimensional space (e.g., three degrees of translational freedom along Cartesian x-, y-, and z-coordinates). As used herein, the term "orientation" refers to the rotational placement of an element or a portion of an element (three degrees of rotational freedom—e.g., roll, pitch, and yaw). As used herein, the term "shape" refers to a set positions or orientations measured along an element. As used herein, and for a device with repositionable arms, the term "proximal" refers to a direction toward the base of the computer-assisted device along its kinematic chain and "distal" refers to a direction away from the base along the kinematic chain.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an embodiment using a surgical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments and embodiments. embodiments on da Vinci® Surgical Systems are merely exemplary and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

System Overview

FIG. 1 is a diagrammatic illustration of a teleoperated surgical system 100, according to some embodiments. Teleoperated surgical system 100 includes an operator workstation (e.g., surgeon's console) 102 and a teleoperated manipulator device 104.

In this example, the operator workstation 102 includes a viewer 213 (shown in FIG. 2) where an image of a worksite is displayed during an operating procedure using the system 100. For example, the image can be displayed by a display device such as one or more display screens, and the image can depict a surgical site during a surgical procedure. A support 110 is provided on which an operator 112, e.g., a surgeon, can rest his or her forearms while gripping two input controls 210 and 212, which include respective grip input controls (shown in FIG. 2, one in each hand. The input controls are positioned in a workspace 114 disposed inwardly beyond the support 110. When using the workstation 102, the operator 112 can sit in a chair in front of the workstation, position his or her eyes in front of the viewer and grip the input controls, one in each hand, while resting his or her forearms on the support 110. Additional details are described below with reference to FIG. 2.

A teleoperated manipulator device 104 is also included in the teleoperated system 100. During a surgical procedure, the teleoperated manipulator device 104 can be positioned close to a patient (or simulated patient) for surgery, where the teleoperated manipulator device 104 can remain stationary until a particular surgical procedure or stage of a procedure is completed. Teleoperated manipulator device 104 can include one or more arm assemblies 120. In some examples, one or more of the arm assemblies 120 can be configured to hold an image capturing device, e.g., an endoscope 122, which can provide captured images of a portion of the surgical site. In some embodiments, the captured images can be transmitted to the viewer of the workstation 102 and/or transmitted to one or more other displays, e.g., a display 124 coupled to the teleoperated manipulator device 104. In some examples, each of the other arm assemblies 120 may include a surgical tool 126 (which may also be referred to herein as an "instrument"). Each surgical tool can include a surgical end effector, e.g., for treating tissue of the patient.

In this example, the arm assemblies 120 can be caused to move and articulate the surgical tools 126 in response to manipulation of the input controls 210 and 212 at the workstation 102 by the operator 112, e.g., so that the operator 112 can direct surgical procedures at internal surgical sites through minimally invasive surgical apertures. For example, one or more actuators coupled to the arm assemblies 120 can output force to cause links or other portions of the arm assemblies to move in particular degrees of freedom in response to control signals received from the workstation 102. The workstation 102 can be used within a room (e.g., an operating room or interventional suite) with the teleoperated manipulator device 104 or can be positioned more remotely from the teleoperated manipulator device 104, e.g., at a different location than the teleoperated manipulator device. An example of operation of a surgical tool via an operator workstation, and associated operator user interfaces, are described in U.S. Pat. No. 9,050,120, which is incorporated by reference herein.

Some embodiments of the teleoperated system 100 can provide different modes of operation. In some examples, in a non-controlling mode (e.g., safe mode) of the teleoperated system 100, the controlled motion of the teleoperated manipulator device 104 is disconnected from the input controls 210, 212 of the workstation 102 in disconnected configuration, such that movement and other manipulation of the input controls 210, 212 does not cause motion of the teleoperated manipulator device 104. In a controlling mode of the teleoperated system (e.g., following mode), motion of the teleoperated manipulator device 104 can be controlled by the input controls 210 and 212 of the workstation 102 in a leader-follower fashion such that movement and other manipulation of the input controls causes motion of the teleoperated manipulator device 104, e.g., during a surgical procedure. In some cases, the leader-follower arrangement may also be called a master-slave arrangement.

Some embodiments can be or include a teleoperated medical system such as a da Vinci® Surgical System (e.g., a Model IS3000 or IS4000, marketed as the da Vinci® Si® or da Vinci® Xi® Surgical System), commercialized by Intuitive Surgical, Inc. of Sunnyvale, Calif. However, features disclosed herein may be implemented in various ways, including teleoperated and, if applicable, non-teleoperated (e.g., locally-controlled) embodiments. Embodiments on da Vinci® Surgical Systems are merely exemplary and are not to be considered as limiting the scope of the features disclosed herein. For example, different types of teleoperated systems having teleoperated manipulator devices at worksites can make use of actuated controlled features described herein. Other, non-teleoperated systems can also use one or more described features, e.g., various types of control systems and devices, peripherals, etc.

In some embodiments, a controlled teleoperated manipulator device can be a virtual representation of device, e.g., presented in a graphical simulation provided by a computing device coupled to the teleoperated system 100. For example, an operator can manipulate the input controls 210 and 212 of the workstation 102 to control a displayed representation of an end effector in virtual space of the simulation, similarly as if the end effector were a physical object coupled to a physical teleoperated manipulator device.

Figure 2:
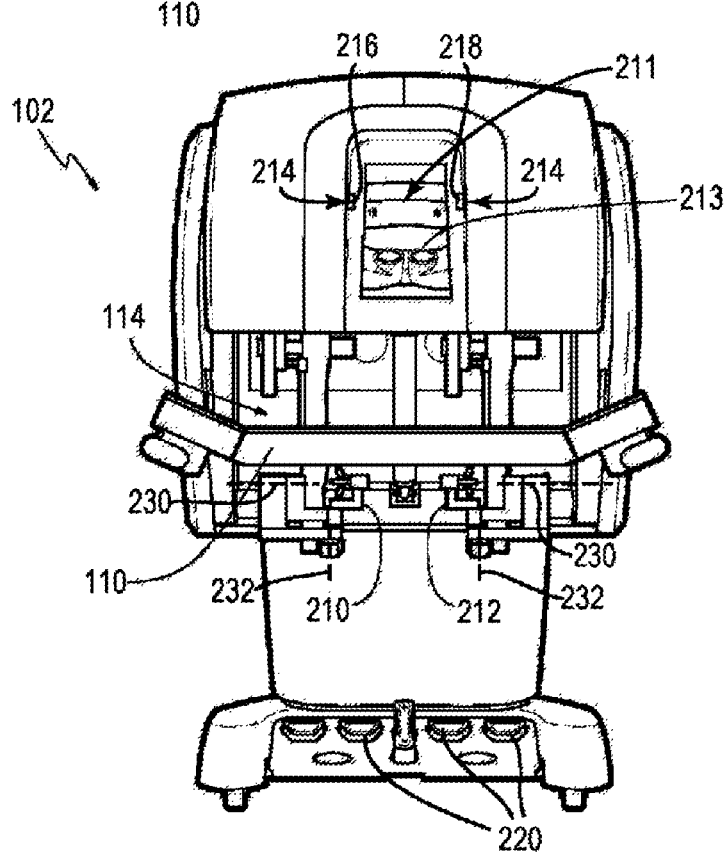
FIG. 2 is a front elevational view of an operator workstation as shown in FIG. 1, according to some embodiments.

FIG. 2 is a front elevational view of the operator workstation 102, according to some embodiments. Operator workstation 102 includes a viewer 213, where an image of a worksite can be displayed during a procedure using the teleoperated system 100. For example, images depicting a surgical site can be displayed during a surgical procedure. The viewer 213 can be positioned within a viewing recess 211 in which the operator can position his or her head to view images displayed by the viewer 213. When using the workstation 102, the operator 112 can sit in a chair in front of the workstation 102 and position his or her head within the recess 211 such that his or her eyes are positioned in front of the viewer 213.

According to some embodiments, one or more presence sensors 214 can be positioned at one or more locations of the operator workstation 102 to detect the presence of an operator located next to or near to the workstation 102. In this example, the presence sensors 214 can sense a presence of a head of the operator within the recess 211. For example, an optical sensor can be used for a presence sensor, where the optical sensor includes an emitter 216 and a detector 218. A beam of infrared or other wavelength of light is emitted from one side of the recess 211 by the emitter 216, and the beam is detected on the other side of the recess by the detector 218. When the beam is interrupted from detection by the detector, the system determines that a head of the operator is within the recess and that the operator is in a proper position to use the input controls of the operator workstation 102. Additional or alternative types of presence sensors can be used in various embodiments.

Two input controls 210 and 212 are provided for operator manipulation. In some embodiments, each input control 210 and 212 can be configured to control motion and functions of an associated arm assembly 120 of the teleoperated manipulator device 104. For example, an input control 210 or 212 can be moved in a plurality of degrees of freedom to move a corresponding end effector of the teleoperated manipulator device 104 in corresponding degrees of freedom. The input controls 210 and 212 are positioned in workspace 114 disposed inwardly beyond the support 110. For example, an operator 112 can rest his or her forearms while gripping the two input controls 210, 212, with one controller in each hand. The operator also positions his or her head within the viewing recess 211 to view the viewer 213 as described above while manipulating the input controls 210 and 212. Various examples of a grip input control portion suitable for use with input controls 210 and 220 are described below.

Some embodiments of workstation 102 can include one or more foot controls 220 positioned below the input controls 210 and 212. The foot controls 220 can be depressed, slid, and/or otherwise manipulated by the feet of the operator to input various commands to the teleoperated system while the operator is sitting at the operator workstation 102. In various embodiments, foot controls 220 include multiple sets of foot controls, which may be colored differently and can be identified based on their colors (e.g., a set of blue-colored foot controls and a set of yellow-colored foot controls). Different sets of foot controls can be depressed, slid, and/or otherwise manipulated by the operator to input different commands to the teleoperated system. In various embodiments, the teleoperated surgical system 100 further includes an electrocautery generator (e.g., a bipolar generator, a mono-polar generator) that can be controlled via the operator workstation 102. The electrocautery generator can be configured to transmit energy to a surgical tool 126 (e.g., energy to coagulate and/or seal tissue being manipulated via the surgical tool 126) in response to inputs made by the operator 112 at the operator workstation 102 (e.g., in response to operator manipulation of the input controls 210 and 212 and/or the foot controls 220).

Figure 3:
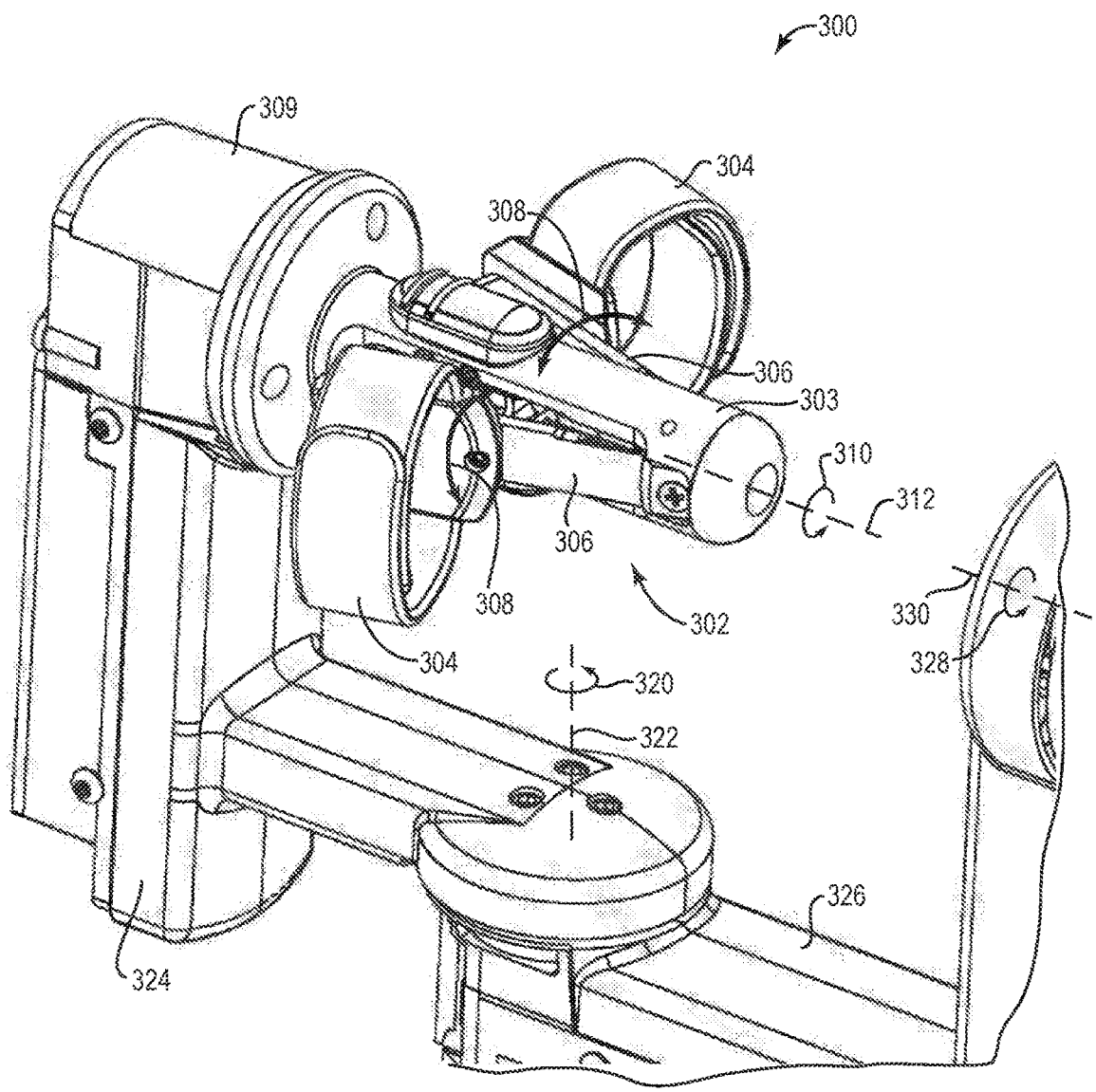
FIG. 3 is a perspective view of a grip input control, according to some embodiments.

FIG. 3 is a perspective view of a grip input control, according to some embodiments. In some embodiments, grip input control 300 can be used as a portion of an input control 210 or 212 as described above with reference to FIGS. 1 and 2. In some embodiments, the grip input control 300 includes one or more gimbal mechanisms.

Grip input control 300 includes a handle 302 which is contacted by an operator to manipulate the grip input control 300. In this example, the handle 302 includes two grips that each include a finger loop 304 and a grip member 306. The two grip members 306 are positioned on opposite sides of a central portion 303 of the handle 302, where the grip members 306 can be grasped, held, or otherwise contacted by fingers of the operator. The two finger loops 304 are attached to grip members 306 and can be used to secure the fingers to the associated grip members 306. The operator may also contact other portions of handle 302 while grasping the grip members 306. The grip members 306 are pivotally attached to the central portion 303 of the handle 302. Each grip member 306 and finger loop 304 can be moved in an associated degree of freedom 308 by the operator. For example, the grip members 306 can be moved concurrently in a pincher-type of movement (e.g., toward or away from each other), pivoting about the central portion 303. Accordingly, the operator can "close" (grip members 306 move toward each other) or "open" (grip members 306 move away from each other) the grip members 306. In various embodiments, a single grip member 306 and finger loop 304 can be provided, or only one of the grip members 306 can be moved in the degree of freedom 308 while the other grip member 306 can be fixed with reference to the handle 302.

One or more sensors (not shown) coupled to the handle 302 can detect the positions of the grip members 306 in their degree of freedom 308 and send signals describing the positions to one or more control circuits of the teleoperated system 100. The control circuits can provide control signals to the teleoperated manipulator device 104. For example, the positions of the grip members 306 in degree of freedom 308 can be used to control any of various degrees of freedom of an end effector of the teleoperated manipulator device 104. Various embodiments can provide one or more active actuators (e.g., motors, voice coils, etc.) to output active forces on the grip members 306 in the degree of freedom 308. For example, a sensor and/or actuator can be housed in central portion 303 or in housing 309 and coupled to the grip members 306 by a transmission. Some embodiments of the grip input control 300 can further provide one or more passive actuators (e.g., springs) between the grip members 306 and the central portion 303 of the handle 302 to augment the one or more active actuators (e.g., to provide additional resistance in particular directions of the grip members 306 (e.g., movement in directions toward each other in degree of freedom 308)).

The handle 302 of example grip input control 300 can additionally be provided with a rotational degree of freedom 310 about an axis 312 extending approximately along the center of the central portion 303 of handle 302. An operator can rotate the grip members 306 as a single unit around the axis 312 to provide control of, e.g., an end effector of the teleoperated manipulator device 104 or other element of the teleoperated manipulator device 104.

One or more sensors (not shown) can be coupled to the handle 302 to detect the rotation and/or position of the handle 302 in the rotational degree of freedom 310. For example, the sensor can send signals describing the position to one or more control circuits of the teleoperated system 100 which can provide control signals to the teleoperated manipulator device 104 similarly as described above. For example, degree of freedom 310 can control a particular degree of freedom of an end effector of the teleoperated manipulator device 104 that is different than a degree of freedom controlled by degree of freedom 308 of the grip members 306.

Some embodiments of the grip input control 300 can provide one or more actuators to output forces on the handle 302 (including grip members 306 and finger loops 304) in the rotational degree of freedom 310. For example, a sensor and/or actuator can be housed in housing 309 and coupled to the handle 302 by a shaft extending through the central portion 303 of the handle 302.

In various embodiments, the handle 302 can be provided with additional degrees of freedom. For example, a rotational degree of freedom 320 about an axis 322 can be provided to the handle 302 at a rotational coupling between an elbow shaped link 324 and a link 326, where the elbow shaped link 324 is coupled to the handle 302 (e.g., at housing 309). For example, axis 322 can be similar to axis 232 shown in FIG. 2. Additional degrees of freedom can similarly be provided. For example, link 326 can be elbow-shaped and a rotational coupling can be provided between the other end of link 326 and another link (not shown). A rotational degree of freedom 328 about an axis 330 can be provided to the handle 302 at the rotational coupling. For example, axis 330 can be similar to axis 230 shown in FIG. 2. In some examples, the grip input control 300 can allow movement of the handle 302 within the workspace 114 of the operator workstation 102 with a plurality of degrees of freedom, e.g., six degrees of freedom including three rotational degrees of freedom and three translational degrees of freedom. This allows the handle 302 to be moved to any position and any orientation within its range of motion. One or more additional degrees of freedom can be sensed and/or actuated similarly as described above for the degrees of freedom 308 and 310. In some embodiments, each additional degree of freedom of the handle 302 can control a different degree of freedom (or other motion) of an end effector of the teleoperated manipulator device 104.

Figure 4:
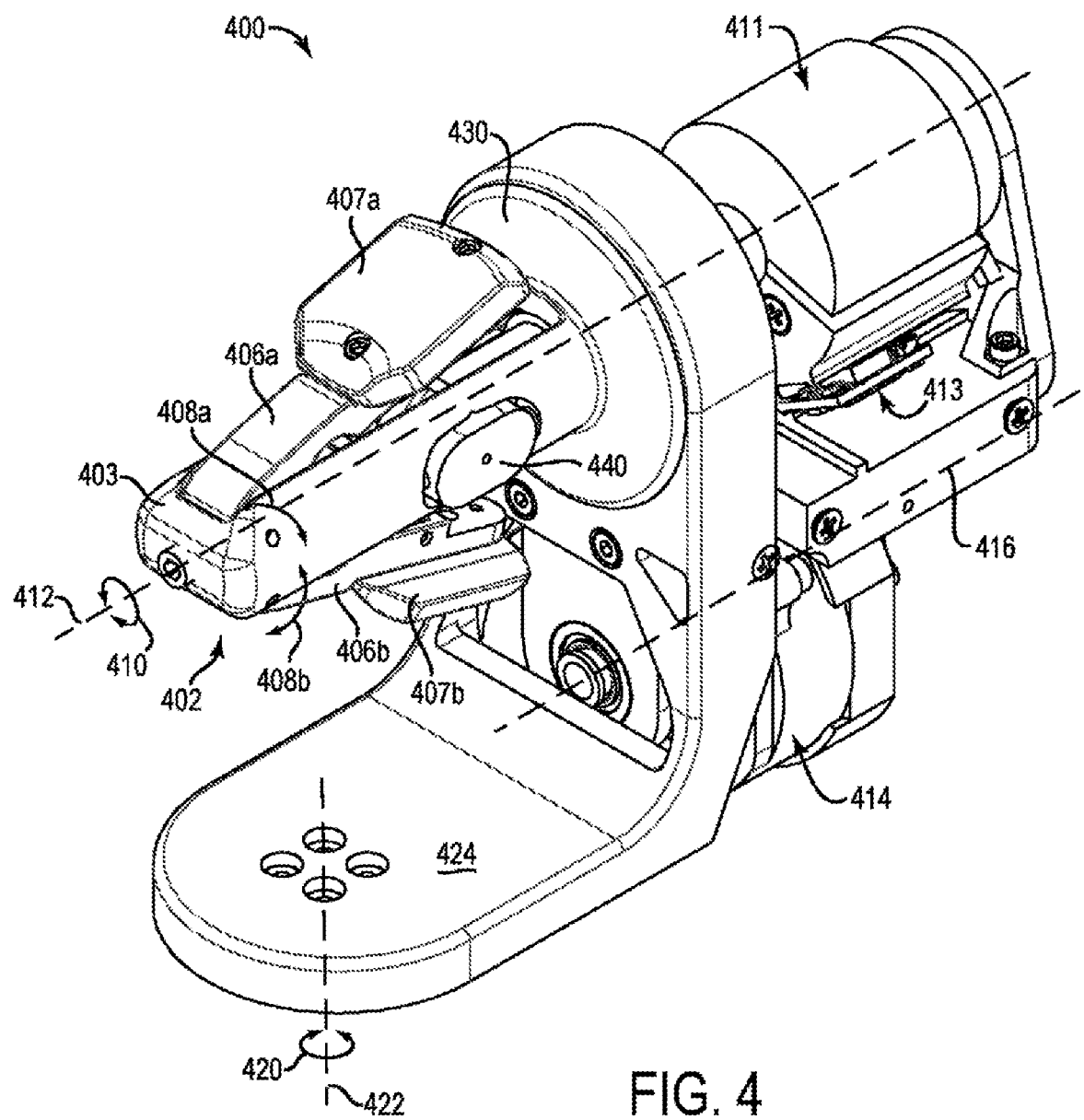
FIGS. 4 and 5 are views of another grip input control, according to some embodiments.
Figure 5:
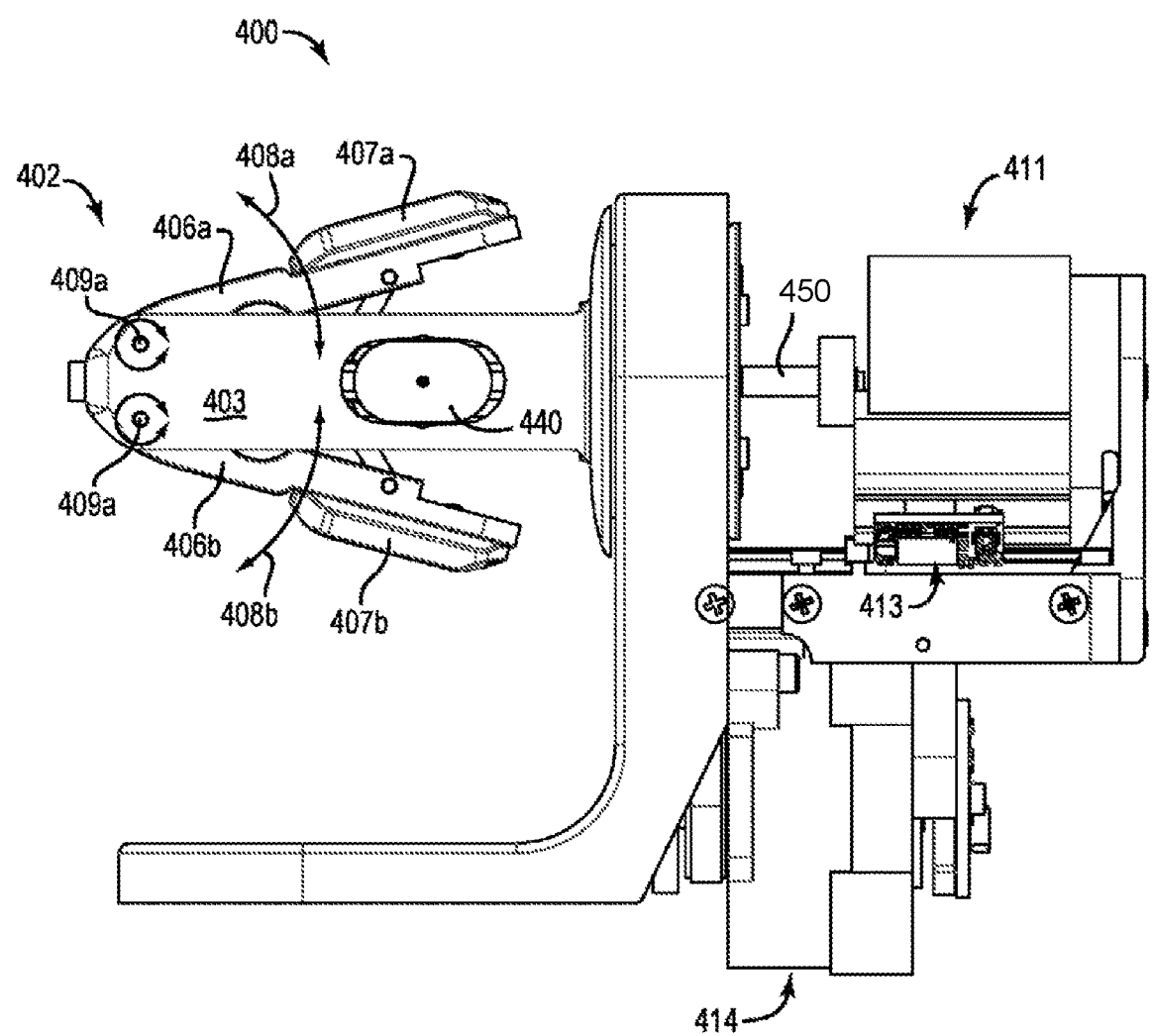

FIG. 4 is a perspective view and FIG. 5 is a side elevational view of another grip input control 400 according to some embodiments. In some embodiments, grip input control 400 can be used as a portion of input controls 210 or 212 as described above with reference to FIGS. 1 and 2. In some embodiments, the grip input control 400 includes one or more gimbal mechanisms. In this example embodiment, the grip input control 400 can provide forces in the degrees of freedom of grip input control 400.

According to some embodiments, grip input control 400 can include several elements similar to grip input control 300 shown in FIG. 3. For example, a handle 402 can be contacted by an operator to manipulate the grip input control 400. In this example, the handle 402 includes two grips that each include a grip member 406a or 406b. The two grip members 406a and 406b are positioned on opposite sides of a central portion 403 of the handle 402, where the grip members 406a and 406b can be grasped, held, or otherwise contacted by fingers of the operator. For example, finger contacts 407a and 407b can be connected or formed at the unconnected end of the grip members 406a and 406b, respectively, to provide surfaces to contact the fingers of the operator. Finger loops (not shown) similar to finger loops 304 of FIG. 3 can be attached to the grip members in some embodiments, e.g., to secure the finger of an operator to the associated grip members 406a and 406b.

The grip members 406a and 406b are coupled to the central portion 403 of the handle 402 at rotational couplings 409a and 409b, respectively, allowing rotational movement of the grip members with respect to the central portion. Each grip member 406a and 406b can be moved in an associated degree of freedom 408a and 408b, respectively (see FIG. 5), e.g., by an operator contacting the grip members. For example, in some embodiments the grip members 406a and 406b can be moved concurrently in a pincher-type of movement (e.g., toward or away from each other to "close" or "open," respectively, the grip members). For example, the first and second grip members can move concurrently and in coordination, e.g., move in opposing directions and by the same angular amount in their respective degrees of freedom in response to motion of the main shaft. In various embodiments, a single grip member 406a or 406b can be provided, or only one of the grip members 406a or 406b can be moved in the associated degree of freedom 408a or 408b while the other grip member 406b or 406a can be fixed with reference to the handle 402. In other embodiments, the grip members can be coupled to the handle with other mechanisms and can be moved in linear degrees of freedom, e.g., in linear directions toward and away from the central portion 403 of the handle 402.

One or more sensors (not shown in FIGS. 4-5) can be coupled to the handle 402 and/or other components of the grip input control 400 and can detect the positions of the grip members 406a and 406b. The sensors can send signals describing sensed positions and/or motions to one or more control circuits of the teleoperated system 100. In some modes or embodiments, the control circuits can provide control signals to the teleoperated manipulator device 104. For example, the positions of the grip members 406a and 406b in degrees of freedom 408a and 408b can be used to control any of various degrees of freedom of an end effector of the teleoperated manipulator device 104, some examples of which are described herein.

An active actuator (e.g., motor, voice coil, etc.) 411 can be coupled to the grip members 406a and 406b and can output active forces and/or torques on the grip members in either or both of degrees of freedom 408a and 408b based on control signals received by the actuator 411. For example, the actuator 411 can be coupled to the grip members 406a and 406b by a main shaft 450 and/or a transmission.

A sensor 413 can be used to sense motion of the grip members 406a and 406b. Sensor 413 can sense the position of a moving portion of actuator 411 in its linear range of motion (described below), which indicates the position of the grip members 406a and 406b in their rotary degrees of freedom. The sensor 413 can be any of a variety of types of sensors, e.g., a magnetic sensor (e.g., magnetic incremental linear position sensor, Hall Effect sensor, etc.), optical sensor, encoder, resistance sensor, etc.

The handle 402 of example grip input control 400 can additionally be provided
with a rotational degree of freedom 410 about an axis 412 extending approximately along the center of the central portion 403 of handle 402. An operator can rotate the grip members 406a and 406b as a single unit around the axis 412 to provide control of, e.g., an end effector of the teleoperated manipulator device 104 or other component of the teleoperated manipulator device 104.

An active actuator 414 can be coupled to the handle 402 and output forces on the handle 402 (including grip members 406) in the rotational degree of freedom 410. One or more sensors can be coupled to the handle 402 to detect the rotation and/or position of the handle 402 in the rotational degree of freedom 410. For example, the sensor can send signals describing the position to one or more control circuits of the teleoperated system 100 which can provide control signals to the teleoperated manipulator device 104 similarly as described above. In some examples, a sensor (e.g., a rotary encoder) can be coupled with actuator 414 to sense rotation of the actuator shaft of actuator 414 and sense rotation of the handle about axis 412.

In various embodiments, the handle 402 can be provided with additional degrees of freedom. For example, a rotational degree of freedom 420 about an axis 422 can be provided to the handle 402 at a rotational coupling between an elbow shaped link 424 and another link (not shown), similarly as shown for elbow shaped link 324 and link 326 of grip input control 300 of FIG. 3. Additional degrees of freedom can similarly be provided as described above for FIG. 3. In some examples, the grip input control 400 can allow movement of the handle 402 within the workspace 114 of the operator workstation 102 with a plurality of degrees of freedom, e.g., six degrees of freedom including three rotational degrees of freedom and three translational degrees of freedom. This allows the handle 402 to be moved to any position and any orientation within its range of motion. One or more additional degrees of freedom can be sensed and/or actuated similarly as described above for the degrees of freedom. In some embodiments, each additional degree of freedom of the handle 402 can control a different degree of freedom of an end effector of the teleoperated manipulator device 104.

In some embodiments, handle 402 can also include one or more switches or buttons 440, e.g., coupled to the central portion 403 or to mechanisms within central portion 403. For example, two buttons 440 can each be positioned on opposite sides of axis 412, or additional buttons can be provided. In some examples, button 440 can slide parallel to the axis 412, e.g., as directed by a finger of an operator, or the button can be depressed. The button 440 can be moved to various positions to provide particular command signals, e.g., to select functions, options, or modes of the control console and/or input control (e.g., a controlling mode or non-controlling mode as described below), to command a teleoperated manipulator device or other system in communication with the input control, etc. In an example embodiment, button 440 can be coupled to a magnet. For example, button 440 can be coupled to a rod that extends parallel to the axis 412, where the rod can include a magnet at its end. The magnet is sensed by a magnetic sensor coupled to a plate 430, where the plate 430 is rigidly coupled to the central portion 403 of the handle 402. When the button 440 is activated by the operator, e.g., slid by an operator parallel to axis 412, the magnet is moved into a range sensed by the magnetic sensor. Other types of sensors can alternatively be used, such as optical sensors, mechanical switches, etc.

In some embodiments, a touch-sensitive sensing surface can be provided on the handle 402 to sense the touch of an operator using any of a variety of types of sensors such as capacitive sensors, resistive sensors, optical sensors, etc. In some examples, one or more such sensing surfaces can be provided on the central portion 403 of the handle 402. In another example, a sensing surface can be provided on a portion of plate 430. The sensing surface can be tapped by a finger of an operator to provide selections or commands, and/or various gestures of finger(s) of the operator over the sensing surface can be sensed to provide different selections or commands (e.g., a swipe, pinch, fingers moving away from each other, etc.).

As discussed above and further emphasized here, FIGS. 4-6 are merely examples which should not unduly limit the scope of the claims. Additional examples of input controls and grip input controls are described in U.S. patent application Ser. No. 16/470,114, titled "Actuated Grips for Controller," filed on Jun. 14, 2019, and published on Jan. 16, 2020, as U.S. Patent Application Publication No. US2020/0015917, which is incorporated by reference herein.

Figure 6:
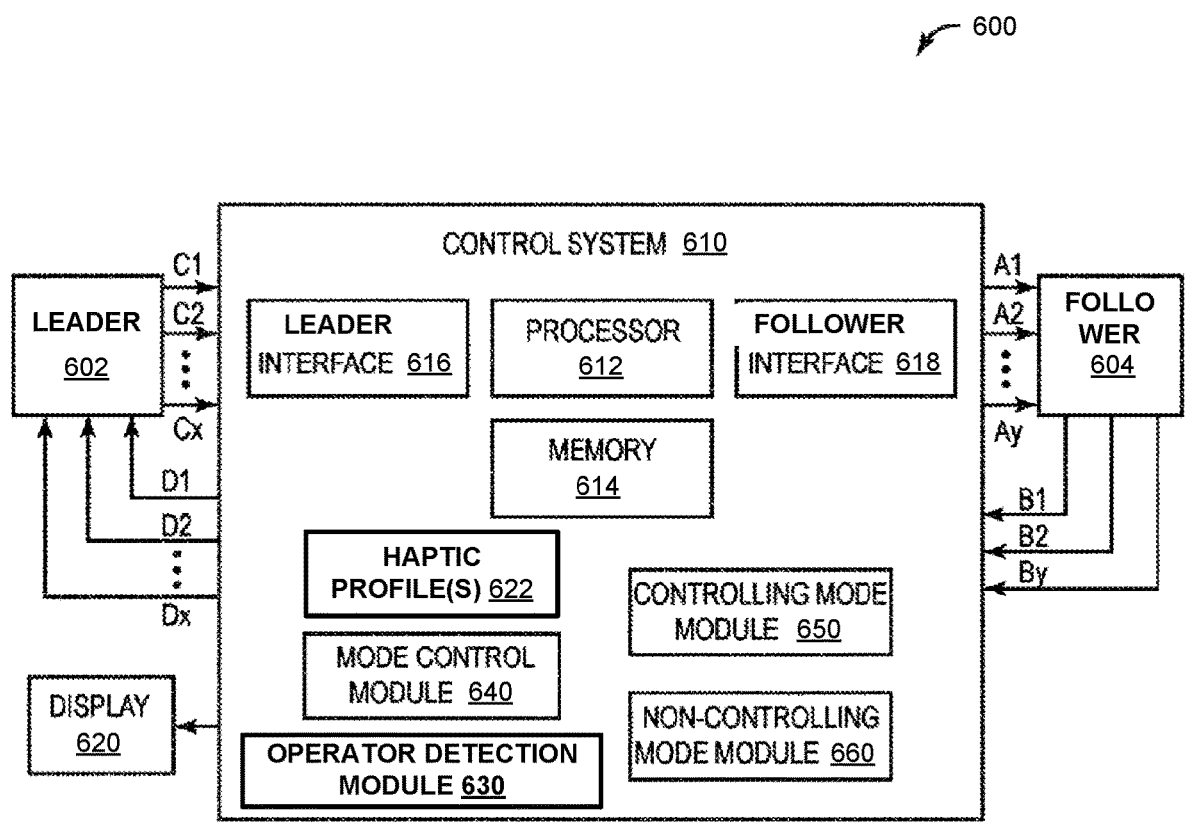
FIG. 6 is a block diagram of a leader-follower system, according to some embodiments.

FIG. 6 is a block diagram of a leader-follower system 600, according to some embodiments. System 600 includes a leader device 602 that an operator may manipulate in order to control a follower device 604 in communication with the leader device 602. In some embodiments, leader device 602 can be, or can be included in, operator workstation 102 of FIG. 1. More generally, leader device 602 can be any type of device providing an input control (e.g., input control 210 and/or 212) that can be physically manipulated by an operator. Leader device 602 generates control signals C1 to Cx indicating positions, states, and/or changes of one or more input controls in their degrees of freedom. The leader device 602 can also generate control signals (not shown) indicating selection of physical buttons and other manipulations by the operator.

A control system 610 can be included in the leader device 602, in the follower device 604, or in a separate device, e.g., an intermediary device between leader device 602 and follower device 604. In some embodiments, the control system 610 can be distributed among multiple of these devices. Control system 610 receives control signals C1 to Cx and generates actuation signals A1 to Ay, which are sent to follower device 604. Control system 610 can also receive sensor signals B1 to By from the follower device 604 that indicate positions, states, and/or changes of various follower components (e.g., manipulator arm elements).

Control system 610 can include general components such as a processor 612, memory 614, and interface hardware 616 and 618 for communication with leader device 602 and follower device 604, respectively. Processor 612 can execute program code and control basic operations of the system 600, and can include one or more processors of various types, including microprocessors, application specific integrated circuits (ASICs), and other electronic circuits. Memory 614 can store instructions for execution by the processor and other data, and can include any suitable processor-readable storage medium, e.g., random access memory (RAM), read-only memory (ROM), Electrical Erasable Read-only Memory (EEPROM), Flash memory, etc. Various other input and output devices can also be coupled to the control system 610, e.g., display(s) 620 such as the viewer 213 of the operator workstation 102 of FIG. 2, display 124 of FIG. 1, and/or foot controls 220 of FIG. 2.

As shown in FIG. 6, control system 610 includes an operator detection module 630, a mode control module 640, a controlling mode module 650, and a non-controlling mode module 660. Other embodiments can use other modules, e.g., a force output control module, sensor input signal module, etc. As used herein, the term "module" can refer to a combination of hardware (e.g., a processor such as an integrated circuit or other circuitry) and software (e.g., machine or processor executable instructions, commands, or code such as firmware, programming, or object code). A combination of hardware and software can include hardware only (i.e., a hardware element with no software elements), software hosted by hardware (e.g., software that is stored at a memory and executed or interpreted by or at a processor), or a combination of hardware and software hosted at hardware. In some embodiments, the modules 630, 640, 650, and 660 can be implemented using the processor 612 and memory 614, e.g., program instructions stored in memory 614 and/or other memory or storage devices connected to control system 610.

Mode control module 640 can detect when an operator initiates a controlling mode and a non-controlling mode of the system, e.g., by operator selection of controls, sensing a presence of an operator at an operator workstation or input control, sensing required manipulation of an input control, etc. The mode control module can set the controlling mode or a non-controlling mode of the control system 610 based on one or more control signals C1 to Cx. For example, mode control module 640 may activate controlling mode operation when operator detection module 630 detects that an operator is in proper position for use of the operator workstation and that signals (e.g., one or more signals C1 to Cx) indicate the operator has contacted the input control. The mode control module 640 may disable controlling mode when no operator touch is detected on the input control and/or when an operator is not in proper position for use of the input control. For example, the mode control module 640 can inform control system 610 or send information directly to controlling mode module 650 to prevent the controlling mode module 650 from generating actuation signals A1 to An that move follower device 604.

In some embodiments, controlling mode module 650 may be used to control a controlling mode of control system 610. Controlling mode module 650 can receive control signals C1 to Cx and can generate actuation signals A1 to Ay that control actuators of the follower device 604 and cause it to follow the movement of leader device 602, e.g., so that the movements of follower device 604 correspond to a mapping of the movements of leader device 602. Controlling mode module 650 can be implemented using any technically feasible technique.

Controlling mode module 650 can also be used to control forces on the input control of the leader device 602 as described herein, e.g., forces output on one or more components of the input control, e.g., grip members, using one or more control signals D1 to Dx output to actuator(s) used to apply forces to the components. For example, one or more of control signals D1 to Dx can be output to one or more actuators configured to output forces to the grip members of the input control as described herein, and output to one or more other actuators of the input control, e.g., actuators configured to output forces that resist closure of the grip members, actuators configured to output forces in a rotary degree of freedom of the controller, actuators configured to output forces on arm links coupled to the input control, etc.

In some examples, control signals D1 to Dx can be used to provide force feedback, gravity compensation, haptic barriers, etc.

In some embodiments, a non-controlling mode module 660 may be used to control a non-controlling mode of system 600. In the non-controlling mode, movement in one or more degrees of freedom of leader device 602, or other manipulations of leader device 602, has no effect on the movement of one or more components of follower device 604. In some examples, non-controlling mode may be used when a portion of follower device 604, e.g., a follower arm assembly, is not being controlled by leader device 602, but rather is floating in space and may be manually moved. For non-controlling mode, non-controlling mode module 660 may allow actuator systems in the follower device 604 to be freewheeling or may generate actuation signals A1 to An, for example, to allow motors or other actuators in an arm to support the expected weight of the arm against gravity, where brakes in the arm are not engaged and permit manual movement of the arm. For example, in a medical procedure, non-controlling mode may allow a surgical side assistant to easily manipulate and reposition an arm or other follower component relative to a patient or directly make some other clinically appropriate adjustment of the arm or follower component.

In some embodiments, non-controlling mode can include one or more other operating modes of the control system 610. For example, a non-controlling mode can be a selection mode in which movement of the input control in one or more of its degrees of freedom and/or selection of controls of the input control (e.g., buttons 440 of FIG. 4) can control selection of displayed options, e.g., in a graphical user interface displayed by display 620 and/or other display device. A viewing mode can allow movement of the input control to control a display provided from cameras, or movement of cameras, that may not be included in the follower device 604. Control signals C1 to Cx can be used by the non-controlling mode module 660 to control such elements (e.g., cursor, views, etc.) and control signals D1 to Dx can be determined by the non-controlling mode module to cause output of forces on the input control during such non-controlling modes, e.g., to indicate to the operator interactions or events occurring during such modes.

In various embodiments, control system 610 further includes haptic profile(s) 622, which can be stored in memory 614. Haptic profile(s) 622 include one or more output profiles that map positions of the input control(s) (e.g., positions of the input controls 210 and/or 212 in the close/open degree of freedom) to output forces and/or torques at the grip members of input control. The output forces and/or torques at the grip members provide haptic resistance to forces and/or torques applied by the operator to further close the grip members; the output forces and/or torques correspond to the amount of force and/or torque that the operator needs to apply to further close the grip members. Haptic profiles 622 can include different profiles for different follower devices 604 (e.g., a profile for each tool or instrument); for different follower devices 604, the output force or torque at the input control can be different for the same input control position. An example of a haptic profile 622 is further described below in conjunction with FIG. 7.

In various embodiments, control system 610 can further modify the functionality of follower device 604 based on control signals C1 thru Cx received from leader device 602 and provide haptic feedback, including one or more haptic barriers, to the operator via leader device 602. Control signals C1 thru Cx can include signals indicating positions, velocities, and/or the like of one or more input controls (e.g., input controls 210 and/or 212) at the leader device 602 in the close/open degree of freedom (e.g., degree of freedom 308 or 408). Based on the position, velocity, and/or the like of the input control(s) as indicated in control signals C1 thru Cx and on a haptic profile 622 associated with the follower device 604 being controlled by the input control, mode control module 640 (or another module in control system 610) can generate control signals D1 thru Dx based on the positions, velocities, and/or the like of the input control(s), and output these control signals D1 thru Dx to one or more actuators (e.g., actuator 411) coupled to the input controls. These control signals D1 to Dx signal the actuator(s) to output a force or torque to the grip members of the input control, as described herein, by an amount defined based on the haptic profile 622. Further, the mode control module 640 can configure a functional mode of follower device 604 based on the position, velocity, and/or the like of the input control(s). The controlling mode module 650 can generate actuation signals A1 thru An based on the configured functional mode of the follower device 604 and optionally on one or more additional input signals included in control signals C1 thru Cx (e.g., signals indicating activation and/or deactivation of different foot controls 220). The controlling mode module 650 can output the signals A1 thru An to the follower device 604 to signal the follower device to perform certain functions according to the configured functional mode. In some embodiments, different portions of the haptic profile 622 correspond to different functional modes of the follower device 604 and transitions between the modes, as further described below.

Figure 7:
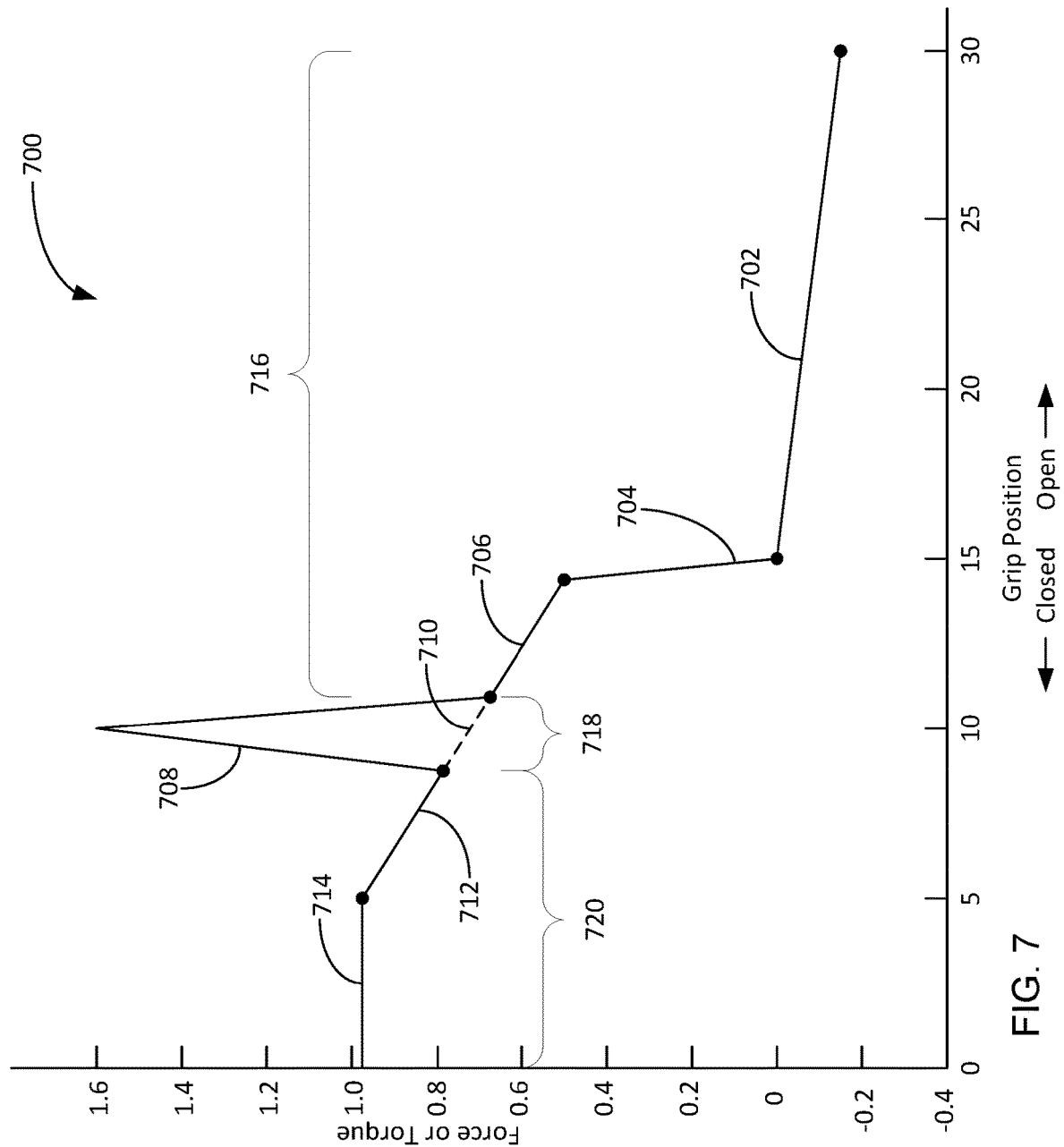
FIG. 7 is a diagrammatic illustration of a haptic profile, according to some embodiments.

FIG. 7 is a diagrammatic illustration of a haptic profile 700, according to some embodiments. As shown in FIG. 7, the x-axis of the coordinates is "grip position," which corresponds to the close/open degree of freedom of input control 210 and/or 212 (e.g., of grip input control 300 or 400 of the input control 210 and/or 212), expressed as an angle between the input controls 210 and 212 about the pivot point of the degree of freedom (e.g., the angle between grip members 306 about central portion 303 along degree of freedom 308). However, in other embodiments, the x-axis may alternatively correspond to a velocity at which the grip input control is being manipulated (e.g., a velocity at which the grip input control closes or opens), and/or the like. The y-axis is an output force or torque output by the input controls 210 and/or 212 to the hands of the operator, and the output force or torque can be perceived by the operator as resistance to the force or torque applied by the operator to the input controls 210 and/or 212. Accordingly, the output force or torque represents the amount of force or torque the operator needs to apply to a grip input control of an input control 210 and/or 212 to further close the grip input control. Control system 610 (e.g., mode control module 640) can generate control signals (e.g., signals D1 thru Dx) based on the position of the grip input control as shown in haptic profile 700; the control system 610 maps the position of the grip input control to an amount of force or torque in the haptic profile 700. The control system 610 can output these control signals to one or more actuators (e.g., actuator 411) coupled to the grip input control. The actuators output an amount of force or torque to the grip input control to resist further closure of the grip input control by the operator. In some embodiments, haptic profile 700 is associated to specific tools and/or instruments; different haptic profiles can be defined for different tools or instruments. In some embodiments, haptic profile 700 may be different for different procedures, operators, and/or the like.

It should be appreciated that while FIG. 7 shows specific values on the x and y axes, the values are exemplary and other suitable values are possible. Further, while FIG. 7 illustrates haptic profile 700 as a piecewise linear graph with specific slopes and beginning and ending points of the piecewise linear portions, haptic profiles can include piecewise linear portions, piecewise curves, and/or any combination thereof with any number of portions, segments, and/or the like.

Haptic profile 700 includes a first region 716, a second region 718, and a third region 720, each of which corresponds to certain ranges of grip positions. The first region 716 begins from an open grip position (30 degrees) and proceeds along a first segment 702. Segment 702 has a relatively easy slope; the output force or torque along segment 702 that resists further closure of the grip input control increases gradually as the grip position proceeds toward the closed position along segment 702.

The first region 716 transitions from segment 702 to segment 704, which represents a "bump," which is a sharp increase in output force or torque and thus resistance to further closure of the grip input control. Segment 704 then transitions to segment 706, which has a steeper slope than segment 702; the output force or torque along segment 706 increases at an increased rate compared to segment 702 as the grip position proceeds toward the closed position along segment 706.

As the grip position continues to proceed toward the closed position, the segment 706 transitions to the second region 718 and a haptic barrier peak 708 included within the second region 718. Haptic barrier peak 708 includes a sharp increase and then a sharp decrease in the output force or torque. Haptic barrier peak 708 corresponds to a haptic barrier or haptic detent, output by the grip input control, that the operator has to overcome to further close the grip input control into the third region 720. The peak output force or torque in the haptic barrier peak 708 is higher than any of the output force or torque in regions 716 or 720. In some embodiments, the operator perceives the haptic barrier, as the operator closes the grip input control through the haptic barrier, as a snapping sensation corresponding to the sharp increase and then decrease in the resistance indicated by the haptic barrier peak 708.

As the grip position continues to proceed toward the closed position, the haptic barrier peak 708 transitions to the third region 720 and segment 712 in the third region 720. Segment 712 continues the output force or torque slope of segment 706 and then transitions to 714, which defines a constant output force or torque up to the closed position.

In various embodiments, regions 716 and 720, on either side of the second region 718 that includes the haptic barrier peak 708, are associated with different functional modes of the follower device 604 (e.g., the tool or instrument) being controlled by the grip input control. For example, the range of grip position within first region 716 corresponds to a first mode of the tool or instrument; the tool or instrument operates according to the first mode when the grip position of the grip input control is in the range within first region 716. The range of grip position within third region 720 corresponds to a second mode, different than the first mode, of the tool or instrument; the tool or instrument operates according to the second mode when the grip position of the grip input control is in the range within third region 720. The range of grip positions within second region 718 corresponds to a transition between the first mode and the second mode; the operator overcomes the haptic barrier of haptic barrier peak 708 and closes the grip input control through the range of grip positions in second region 718 to transition the tool or instrument from the first mode to the second mode. As discussed above and further emphasized here, FIG. 7 is merely an example which should not unduly limit the scope of the claims. One of ordinary skill in the art would recognize many variations, alternatives, and modifications. In some embodiments, the second region 718 may not have any width and may instead correspond to a position where the haptic barrier peak 708 is located and there is a discontinuity in the haptic profile 700. In such embodiments, the first region 716 and the third region 720 may be adjacent to each other such that the transition between the first region 716 and the third region 720 occurs at the position where the haptic barrier peak 708 is located.

In some embodiments, when the operator opens the grip input control and thus changes the grip position toward the open position, the haptic profile 700 is followed except that the haptic barrier peak 708 is disregarded. Instead, segment 712 transitions to segment 710, which then transitions into segment 706. Accordingly, the haptic barrier corresponding to haptic barrier peak 708 is absent when the operator is opening the grip input control. The forces or torques applied while the grip input control is being open help push the grip input control to the open position.

In some embodiments, the location of the haptic barrier peak 708, and correspondingly second region 718, if any, can be located at other locations along haptic profile 700. In some examples, the haptic barrier peak 708 can be located anywhere along segment 706, along any of the other segments of haptic profile 700, overlapping two or more segments of haptic profile 700, and/or the like.

Examples of tools and/or instruments that can operate according to different modes based on a haptic profile 622 (e.g., haptic profile 700) will now be described. In various embodiments, follower devices 604 that can be controlled by the grip input control include tools and/or instruments that can be used to coagulate, seal, and/or cut a material, such as tissue in a medical example. The operator can control these tools using the grip input control in conjunction with other input devices, such as foot controls 222. Examples of such tools and/or instruments include "Vessel Sealer Extend" and "SynchroSeal," both commercialized by Intuitive Surgical, Inc. of Sunnyvale, Calif. Example operation of the SynchroSeal tool and other similar tools are described in PCT International Application Publication No. WO2019/126370, published on Jun. 27, 2019, and in U.S. Provisional Application No. 62/947,263, both of which are incorporated by reference herein. Example operation of the Vessel Sealer Extend tool and other similar tools are described in U.S. Pat. Nos. 10,524,870 and 10,835,332, both of which are incorporated by reference herein.

In some embodiments, the Vessel Sealer Extend tool operates in a first mode and a second mode. The tool initiates in the first mode, before the operator closes the grip input control past the haptic barrier. While in the first mode, when the operator activates a first set of foot controls 222, a coagulation energy is sent to the Vessel Sealer Extend tool to coagulate tissue (e.g., a vessel) being grasped by the tool. The operator can close the grip input control past the haptic barrier to change the mode of the tool from the first mode to a second mode. While in the second mode, when the operator activates the first set of foot controls 222, a sealing energy is sent to the Vessel Sealer Extend tool to seal the tissue. In either mode, when the operator activates a second set of foot controls 222, the tool cuts the tissue; the cutting function is agnostic to the active mode of the tool.

In some embodiments, the SynchroSeal tool also operates in a first mode and a second mode. The tool initiates in the first mode, before the operator closes the grip input control past the haptic barrier. While in the first mode, when the operator activates a first set of foot controls 222, a coagulation energy is sent to the SynchroSeal tool to coagulate tissue (e.g., a vessel) being grasped by the tool. While in the first mode, when the operator activates a second set of foot controls 222, the tool is unaffected; the second set of foot controls 222 has no function in the first mode for this tool. The operator can close the grip input control past a haptic barrier to change the mode of the tool from the first mode to a second mode. While in the second mode, when the operator activates the first set of foot controls 222, a sealing energy is sent to the SynchroSeal tool to seal the tissue. While in the first mode, when the operator activates the second set of foot controls 222, the tool "syncs" (seals and cuts concurrently) the tissue. Table 1 below illustrates the various functionality of the Vessel Sealer Extend and the SynchroSeal tools across different modes.

TABLE 1

|  | Mode 1 | | Mode 2 | |
| --- | --- | --- | --- | --- |
|  | 1st set of foot controls | 2nd set of foot controls | 1st set of foot controls | 2nd set of foot controls |
| Vessel Sealer Extend | Coagulate | Cut | Seal | Cut |
| SynchroSeal | Coagulate | Not Applicable | Seal | Sync |

In some embodiments, the operator can begin operating the Vessel Sealer Extend or SynchroSeal tool by closing the grip input control prior to passing the haptic barrier and press the first set of foot controls to control the tool to apply a coagulation energy according to a first mode. The operator can, while still pressing the foot control, close the grip input control past the haptic barrier, and the tool applies a sealing energy in response to the transition to a second mode caused by the operator passing the haptic barrier. Accordingly, the haptic barrier can be passed and the tool can change modes accordingly while the foot control remains pressed.

Figure 8:
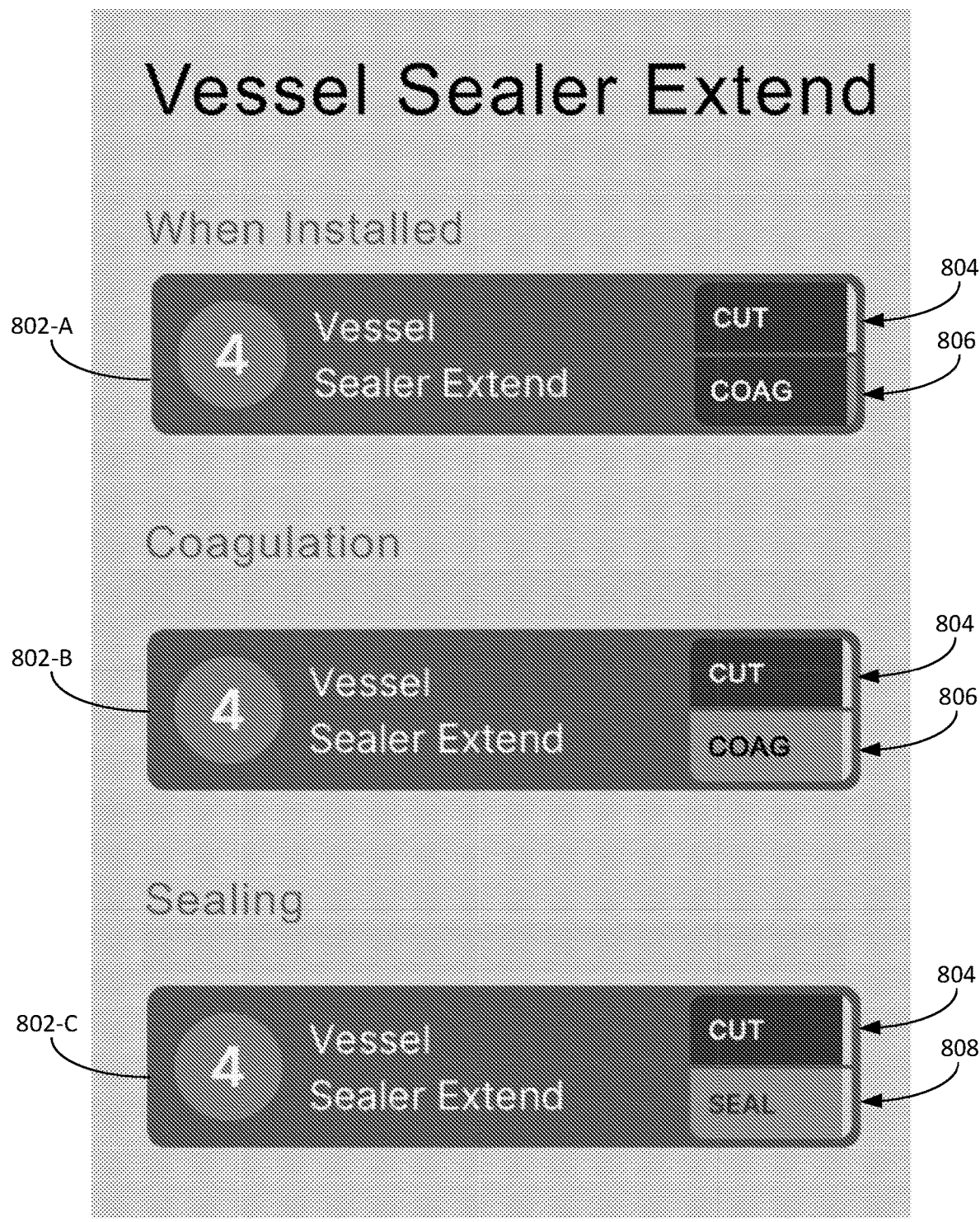
FIG. 8 illustrates example graphical user interfaces indicating the functionality of an example instrument, according to some embodiments.

In some embodiments, a graphical user interface (GUI) can indicate the active mode for a tool based on whether the haptic barrier is passed. FIG. 8 illustrates example graphical user interfaces indicating the functionality of an example instrument, according to some embodiments. FIG. 8 illustrates GUI elements (e.g., portions of a toolbar or a status bar) that indicate the functionality of a Vessel Sealer Extend tool. GUI element 802 includes labels indicating available functions of the Vessel Sealer Extend tool. When the Vessel Sealer Extend tool is installed (e.g., at teleoperated manipulator device 104), GUI element 802-A can be displayed (e.g., on display 124, in viewer 213) while the Vessel Sealer Extend tool is in the first mode. GUI element 802-A includes a "COAG" label 806 corresponding to a coagulation function activatable by a first set of foot controls 222, and a "CUT" label 804, corresponding to a cutting function activatable by a second set of foot controls 222. While in the first mode, and the first set of foot controls 222 is activated, the coagulation function is activated. GUI element 802-B is the same as GUI element 802-A, except that "COAG" label 806 is highlighted to indicate that the coagulation function is activated in response to the first set of foot controls 222 being activated. After the haptic barrier is passed and the mode has changed to the second mode, GUI element 802-C can be displayed. In GUI element 802-C, "COAG" label 806 has been replaced with "SEAL" label 808, indicating that the functionality associated with the first set of foot controls 222 has changed to a sealing function. The "CUT" label 804 remains the same, indicating that the second set of foot controls 222 remains associated with the cutting function in the second mode. When the first set of foot controls 222 is activated in the second mode, the "SEAL" label 808 can be highlighted to indicate that the sealing function is activated in response to the first set of foot controls 222 being activated.

Figure 9:
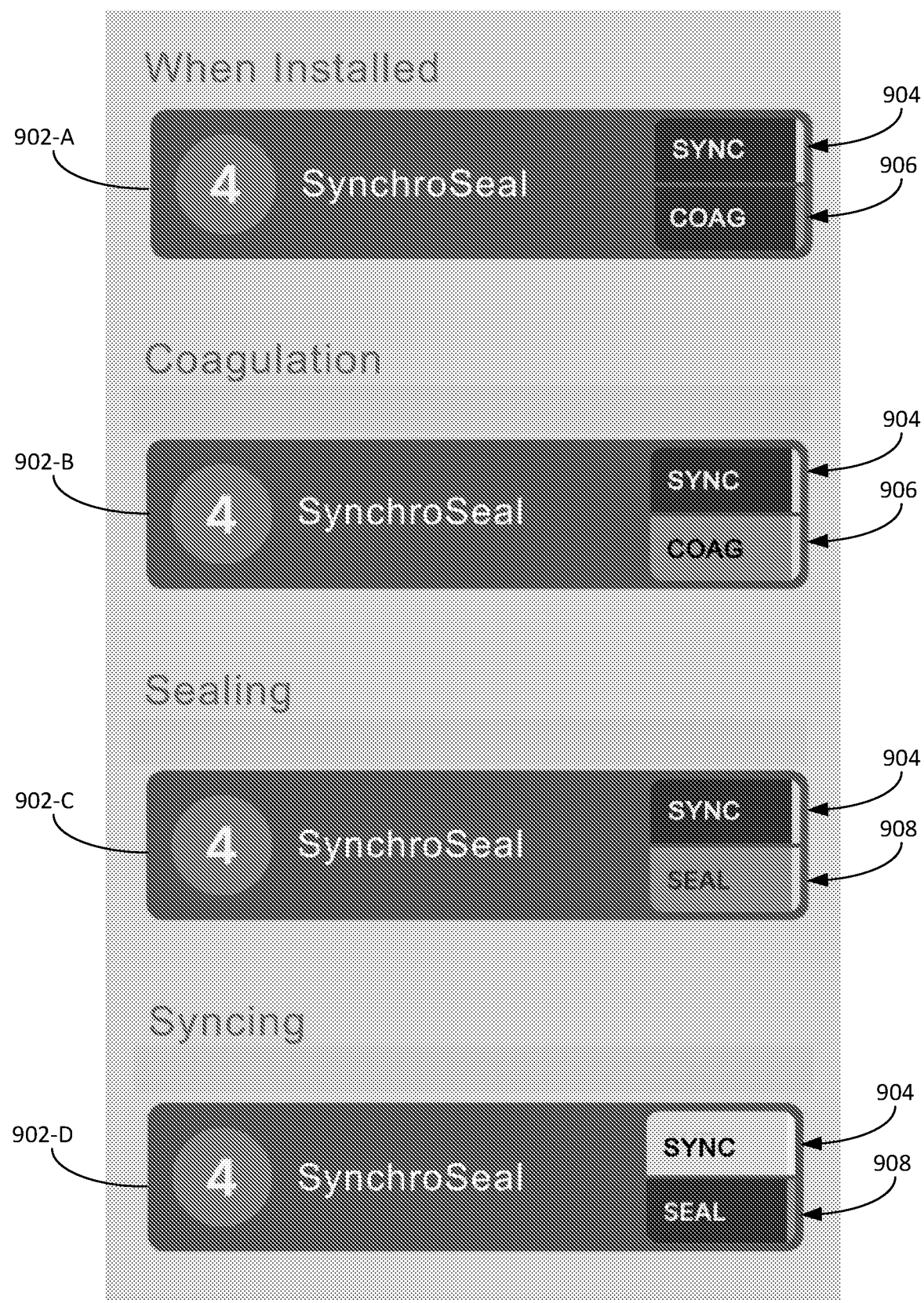
FIG. 9 illustrates example graphical user interfaces indicating the functionality of another example instrument, according to some embodiments.

FIG. 9 illustrates example graphical user interfaces indicating the functionality of another example instrument, according to some embodiments. FIG. 9 illustrates, for a SynchroSeal tool, similar GUI elements as those shown in FIG. 8. When the SynchroSeal tool is installed (e.g., at teleoperated manipulator device 104), GUI element 902-A can be displayed (e.g., on display 124, in viewer 213) while the SynchroSeal tool is in the first mode. GUI element 902-A includes a "COAG" label 906 corresponding to a coagulation function activatable by a first set of foot controls 222, and a "SYNC" label 904, corresponding to a syncing function activatable by a second set of foot controls 222. However, in the first mode the syncing function is not available, and thus activation of the second set of foot controls 222 in the first mode has no effect. While in the first mode, and the first set of foot controls 222 is activated, the coagulation function is activated. GUI element 902-B is the same as GUI element 902-A, except that "COAG" label 906 is highlighted to indicate that the coagulation function is activated in response to the first set of foot controls 222 being activated. After the haptic barrier is passed and the mode has changed to the second mode, GUI element 902-C can be displayed. In GUI element 902-C, "COAG" label 906 has been replaced with "SEAL" label 908, indicating that the functionality associated with the first set of foot controls 222 has changed to a sealing function. The "SYNC" label 904 remains the same, indicating that the second set of foot controls 222 remains associated with the cutting function in the second mode. When the first set of foot controls 222 is activated in the second mode, the "SEAL" label 908 can be highlighted to indicate that the sealing function is activated in response to the first set of foot controls 222 being activated. Additionally, in the second mode the syncing function is available. Thus, when the second set of foot controls 222 is activated in the second mode, the "SYNC" label 904 can be highlighted, as shown in GUI element 902-D, to indicate that the syncing function is activated in response to the second set of foot controls 222 being activated.

Figure 10:
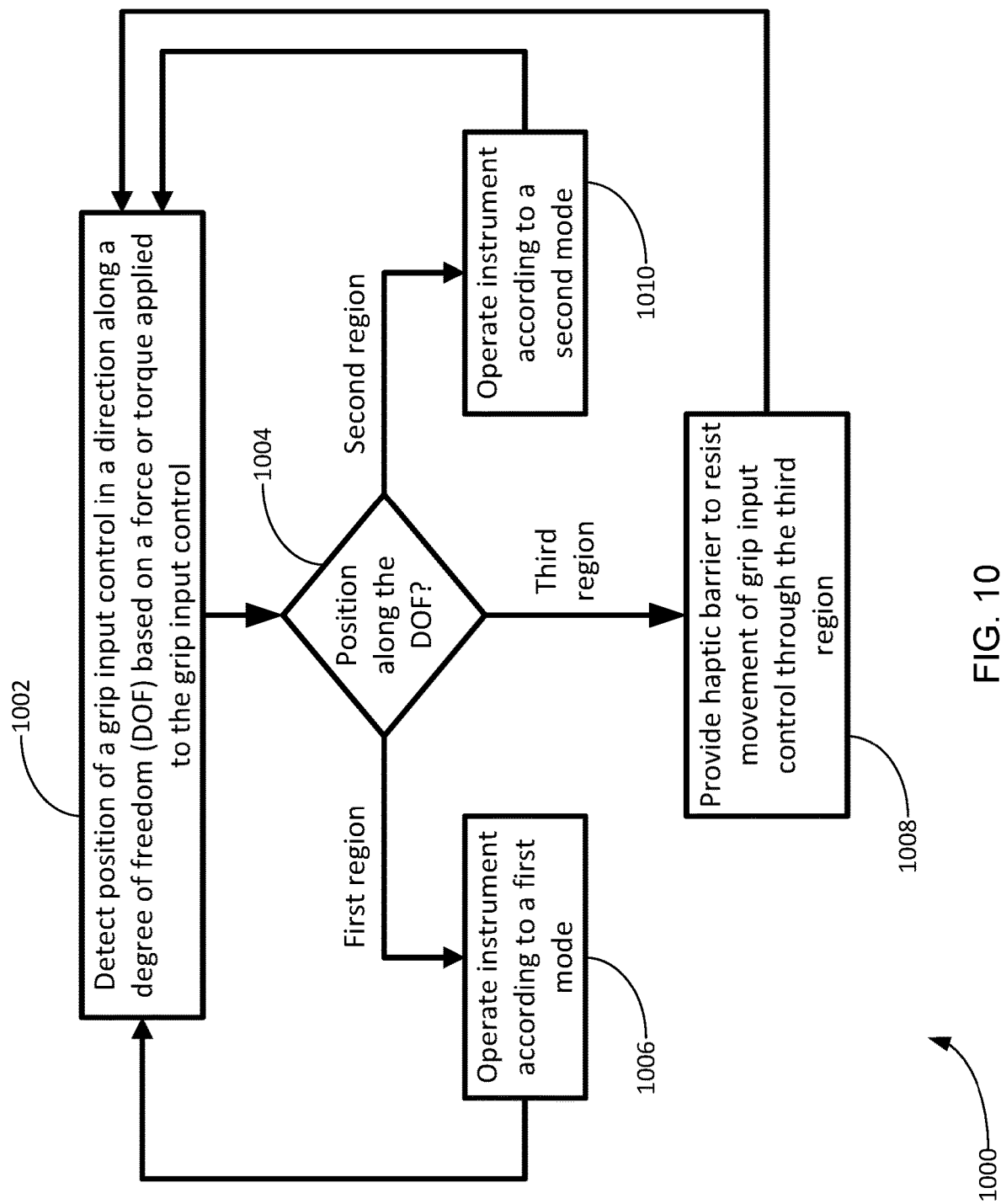
FIG. 10 is a flow diagram of method steps for providing a haptic barrier at a grip input control, according to some embodiments.

FIG. 10 is a flow diagram of method steps for providing a haptic barrier at a grip input control, according to some embodiments. Although the method steps are described with respect to the systems of FIGS. 1-9, persons skilled in the art will understand that any system configured to perform the method steps, in any order, falls within the scope of the various embodiments. In some embodiments, one or more of the steps 1002-1010 of method 1000 may be implemented, at least in part, in the form of executable code stored on one or more non-transient, tangible, machine readable media that when run by one or more processors (e.g., processor 612) may cause the one or more processors to perform one or more of the steps 1002-1010.

As shown, method 1000 begins at step 1002, where a control system 610 detects a position of a grip input control in a direction along a degree of freedom (DOF) based on a force or torque applied to the grip input control. For example, mode control module 640 receives control signals C1 thru Cx indicating the position of the grip input control (e.g., grip input control 300 or 400) of the input control 210 and/or 212 along the close/open degree of freedom, where the grip input control closes or opens along the close/open degree of freedom based on a force or torque applied to the grip input control by an operator. In some embodiments, the control system 610 directly detects the position of the grip input control; the control signals C1 thru Cx directly indicates the grip position, and the control system 610 need not detect the amount and/or direction of force or torque applied to the grip input control by the operator to detect the grip position.

At step 1004, control system 610 determines a position of the grip input control along the degree of freedom based on the control signals. When the position of the grip input control is in a first region, then method 1000 proceeds to step 1006, where the control system 610 operates an instrument according to a first mode. For example, when the position of input control 210 and/or 212 is in the first region 716 associated with the first mode along a haptic profile 700, then control system 610 operates a tool or instrument (e.g., Vessel Sealer Extend, SynchroSeal) according to the first mode. Furthermore, while the position of the input control 210 and/or 212 is in the first region 716, the control system 610 generates and outputs, based on the haptic profile 700 (in particular, the portion of haptic profile 700 within first region 716), signals to actuator 411 to output a force to the input control 210 and/or 212 to resist further closure of the grip input control. Method 1000 then returns to step 1002.

When the position of the grip input control is in a second region or at the position corresponding to a haptic barrier peak, such as haptic barrier peak 708, then method 1000 proceeds to step 1010, where the control system 610 operates an instrument according to a second mode. For example, when the position of input control 210 and/or 212 is in the third region 720 associated with the second mode along the haptic profile 700, then control system 610 operates the tool or instrument according to the second mode. Method 1000 then returns to step 1002. Furthermore, while the position of the input control 210 and/or 212 is in the third region 720, the control system 610 generates and outputs, based on haptic profile 700 (in particular, the portion of haptic profile 700 within third region 720), signals to actuator 411 to output a force to the input control 210 and/or 212 to resist further closure of the grip input control.

When the position of the grip input control is in a third region, then method 1000 proceeds to step 1008, where the control system 610 provides a haptic barrier to resist movement (e.g., further closure) of the grip input control through the third region. For example, when the position of input control 210 and/or 212 is in the second region 718 associated with the haptic barrier along the haptic profile 700, then control system 610 generates and outputs signals to actuator 411 to output a force corresponding to the haptic barrier and according to haptic barrier peak 708 in the haptic profile 700 to the input control 210 and/or 212. Method 1000 then returns to step 1002.

Haptic Profiles

As described above, a haptic profile can include one or more output profiles that map positions of the input control(s) (e.g., positions of the input controls 210 and/or 212 in the close/open degree of freedom) to output forces and/or torques at the grip members of the input control. In some embodiments, an output profile is a haptic profile that can be a subset or a component of another haptic profile, and accordingly can map a subset range of positions of the input control(s) to output forces and/or torques at the input control (e.g., at the grip members). For example, an output profile can be a portion of an overall haptic profile. A haptic profile can include one or more types of output profiles. Examples of types of output profiles are described below.

In some embodiments, haptic profiles can include a linear component of a constant slope, which can be zero or non-zero. Such linear components can be represented as lines on a graph of the haptic profile. Examples of linear components include segments 702 (non-zero slope) and 714 (zero slope) in FIG. 7. A linear component corresponds to, depending on the slope, a constant or a linearly increasing or decreasing output force or torque as the position of the input control along the relevant degree of freedom changes.

In some embodiments, haptic profiles can include a non-linear component. In the non-linear component, the slope of the haptic profile changes with the position of the input control. For example, the non-linear component could be a curve that resembles a curve for an exponential or logarithmic function.

In some embodiments, haptic profiles can include a haptic bumper. A haptic bumper can be a replacement for a mechanical spring bumper. In some embodiments, the application of the haptic profile to the input control can emulate a configuration of two springs. In particular, the two-spring configuration includes a first spring that can provide initial resistance to movement of the input control (e.g., resistance to closure of a grip input control), and a second spring that is stiffer (e.g., provides more resistance) than the first spring and which can indicate an input control position threshold (e.g., a grip closure threshold). The first spring can be a mechanical spring or a spring emulated via haptic feedback on the input control, and the second spring can be emulated via the input control to indicate to the operator when the input control position threshold is passed. In some embodiments, a haptic bumper can include a first linear component, corresponding to a first spring, that transitions into a second linear component associated with higher force or torque values than the first linear component. In some embodiments, a haptic bumper in a haptic profile can be implemented as a sharp increase in the output force or torque relative to input control position, similar to segment 704 in haptic profile 700.

Figure 11:
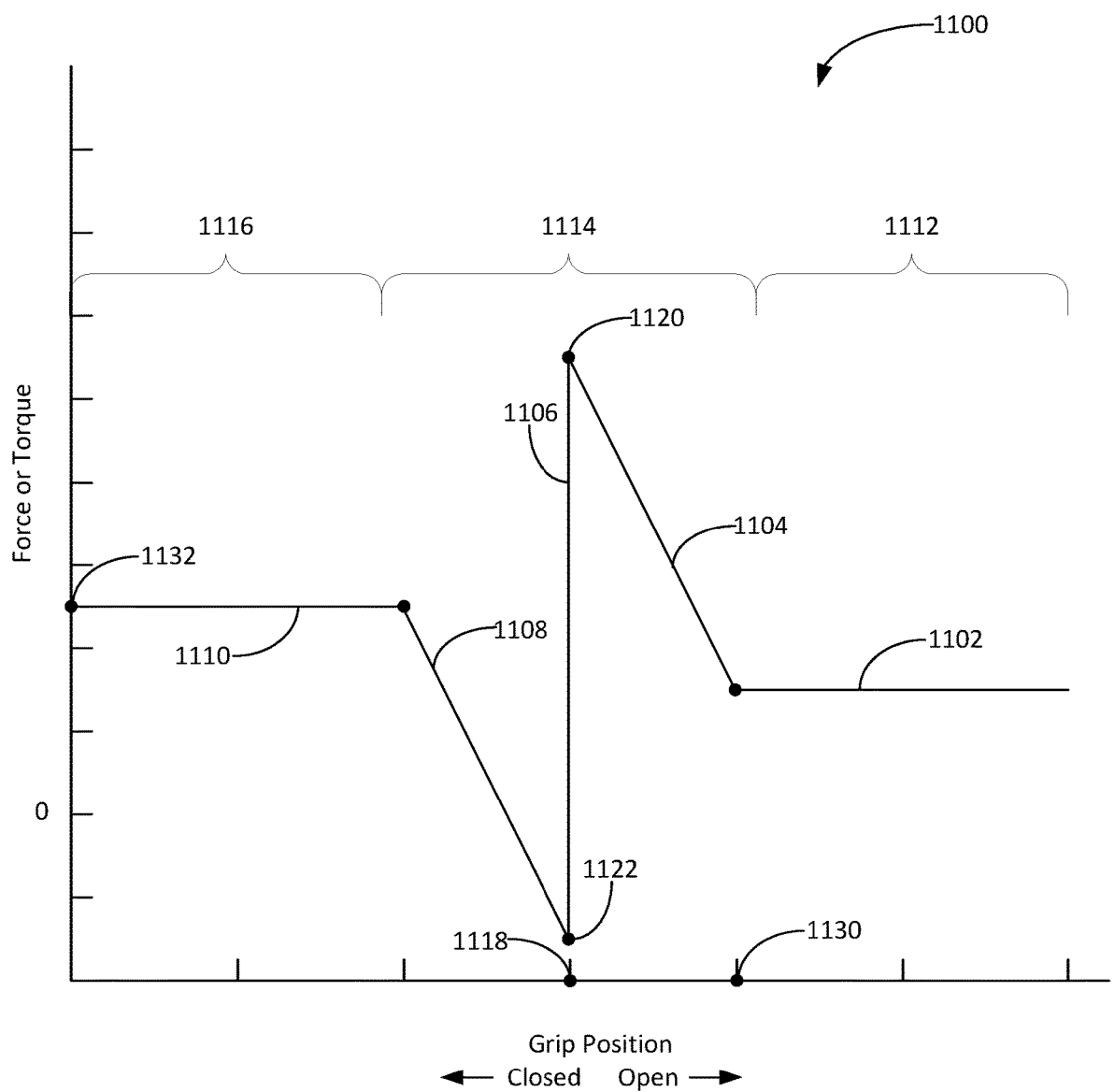
FIG. 11 is a diagrammatic illustration of a haptic profile that includes a haptic detent, according to some embodiments.

FIG. 11 is a diagrammatic illustration of a haptic profile that includes a haptic detent, according to some embodiments. In some embodiments, haptic profiles can include a haptic detent. Similar to FIG. 7, FIG. 11 shows a haptic profile 1100 as a graph along x-y axes, where the x-axis is grip position and the y-axis is a force or torque applied by the input controls 210 and/or 212 (e.g., a grip input control) to provide haptic feedback the hands of the operator.

Haptic profile 1100 includes a first region 1112, a second region 1114, and a third region 1116. The first region 1112 proceeds from an open grip position and proceeds along a first segment 1102 toward a first partially closed grip position 1130. While segment 1102 is shown with a zero slope, segment 1102 can have a constant, relatively shallow slope similar to segment 702 in haptic profile 700. The first region 1112 transitions to a second region 1114, which includes a haptic detent. The haptic detent includes segments 1104, 1106, and 1108. Segment 1104 represents a sharp increase in the force or torque as the grip position enters into the second region 1114 and increases to a peak or upper-bound force or torque 1120.

Segment 1104 then transitions from peak force or torque 1120 into segment 1106, which represents a sharp drop in the force or torque as the grip position indicates further closure of the grip input control, from peak force or torque 1120 to a trough or lower-bound force or torque 1122. In some embodiments, trough force or torque 1122 is below a zero force or torque threshold, which corresponds to an output force or torque that holds the grip input control at a detent position 1118 and resists further closure or opening of the grip input control away from detent position 1118. While segment 1106 is illustrated as a vertical line, segment 1106 in the haptic profile can be an inclined segment with a steep downward slope.

Segment 1106 transitions from trough force or torque 1122 into segment 1108, which represents an increase in the force or torque relative to the grip position from trough force or torque 1122 to a larger output force or torque 1132 that continues to resist further closure of the grip input control. Segment 1108 transitions into segment 1110, which is another segment with a zero slope. In some embodiments, segment 1110 can have a shallow upward slope instead of a zero slope. Correspondingly, region 1114 transitions into a third region 1116; region 1116 corresponds to an exit from the haptic detent of region 1114.

While haptic profile 1100 shows trough force or torque 1122 of the haptic detent of region 1114 as below the zero-force threshold (e.g., positioned below zero force or torque on the y-axis as shown), in some embodiments the trough force or torque of a haptic detent can be above the zero-force threshold.

Because the haptic detent holds the grip input control at the detent position, when the operator moves the input control past the haptic detent (e.g., closes the grip input control from region 1112, through region 1114, to region 1116), and then releases the grip input control, the haptic profile 1100 will cause the grip input control to open only as far as the detent position. In some embodiments, the haptic detent can be removed from the haptic profile, and as a result the grip input control is no longer held at the detent position, by the operator moving the input control to a position that is associated with a release or removal of the haptic detent (e.g., closing the grip input control to a release trigger position, which can be, for example, a fully closed position or an over-closed position).

In some embodiments, the haptic detent in region 1114 of haptic profile 1100 can be dynamically modified. Control system 610 can dynamically modify the haptic detent region in response to a state or mode of the input control and/or the instrument, and/or in response to an additional input made by the operator (e.g., the operator steps on an input foot pedal). The modification can include widening or narrowing region 1114 and correspondingly the range of grip positions covered by the haptic detent (e.g., by changing the slopes of segments 1104, 1106, and/or 1108). The modification can additionally or alternatively include shifting region 1114 leftward or rightward along the grip position axis, thereby associating the haptic detent with different grip positions.

In some embodiments, a haptic detent can be active in one direction of motion of the input control and not active in the other, opposite direction of motion of the input control. For example, the haptic detent in region 1114 can be active in the closing direction (e.g., closing the grip input control), but is removed in the opening direction (e.g., opening the grip input control) and replaced with another output profile (e.g., a linear component).

In some embodiments, a haptic detent can be implemented for a single-finger input control associated with an instrument (e.g., input control for a needle driver, a hooking instrument, a suction irrigator, or an energy instrument) or a multi-finger input control associated with an instrument (e.g., input control for a gripper jaw instrument). For example, a haptic detent could be implemented to facilitate fixing of a position of an instrument by the operator (e.g., to maintain progress of movement of the instrument toward the desired destination).

Figure 12:
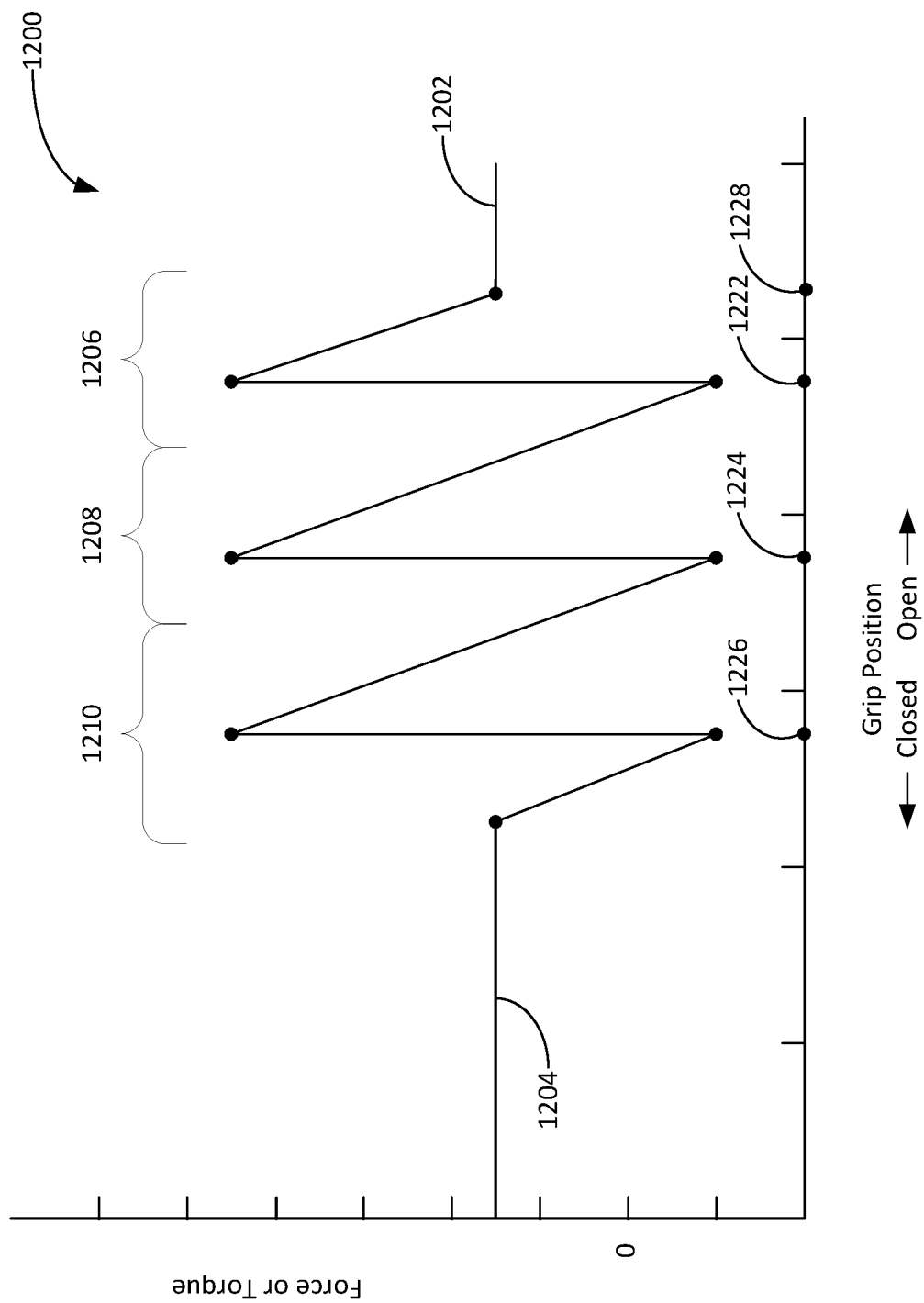
FIGS. 12-14 are diagrammatic illustrations of haptic profiles that include a series of ratcheting haptic detents, according to some embodiments.
Figure 13:
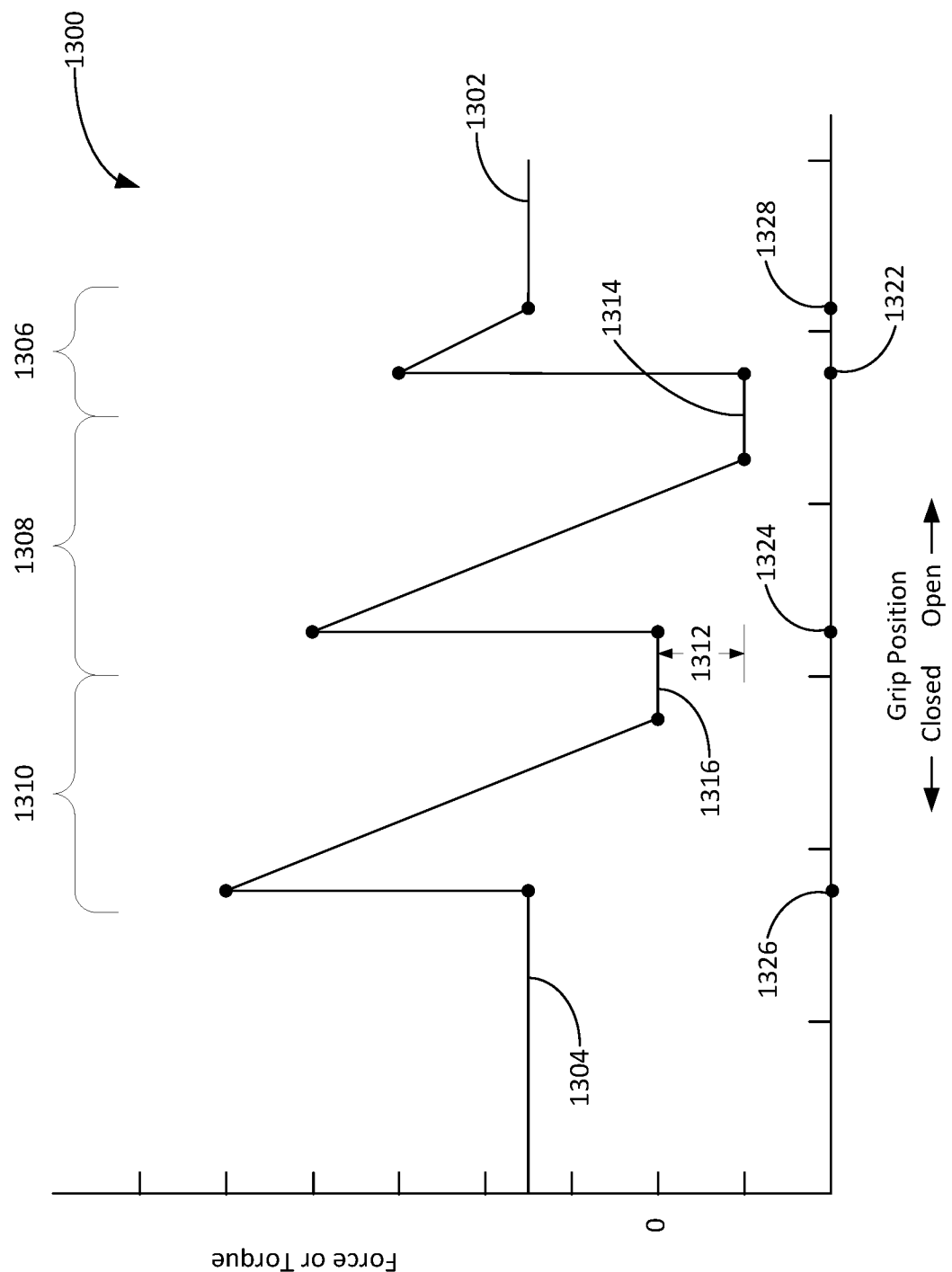
Figure 14:
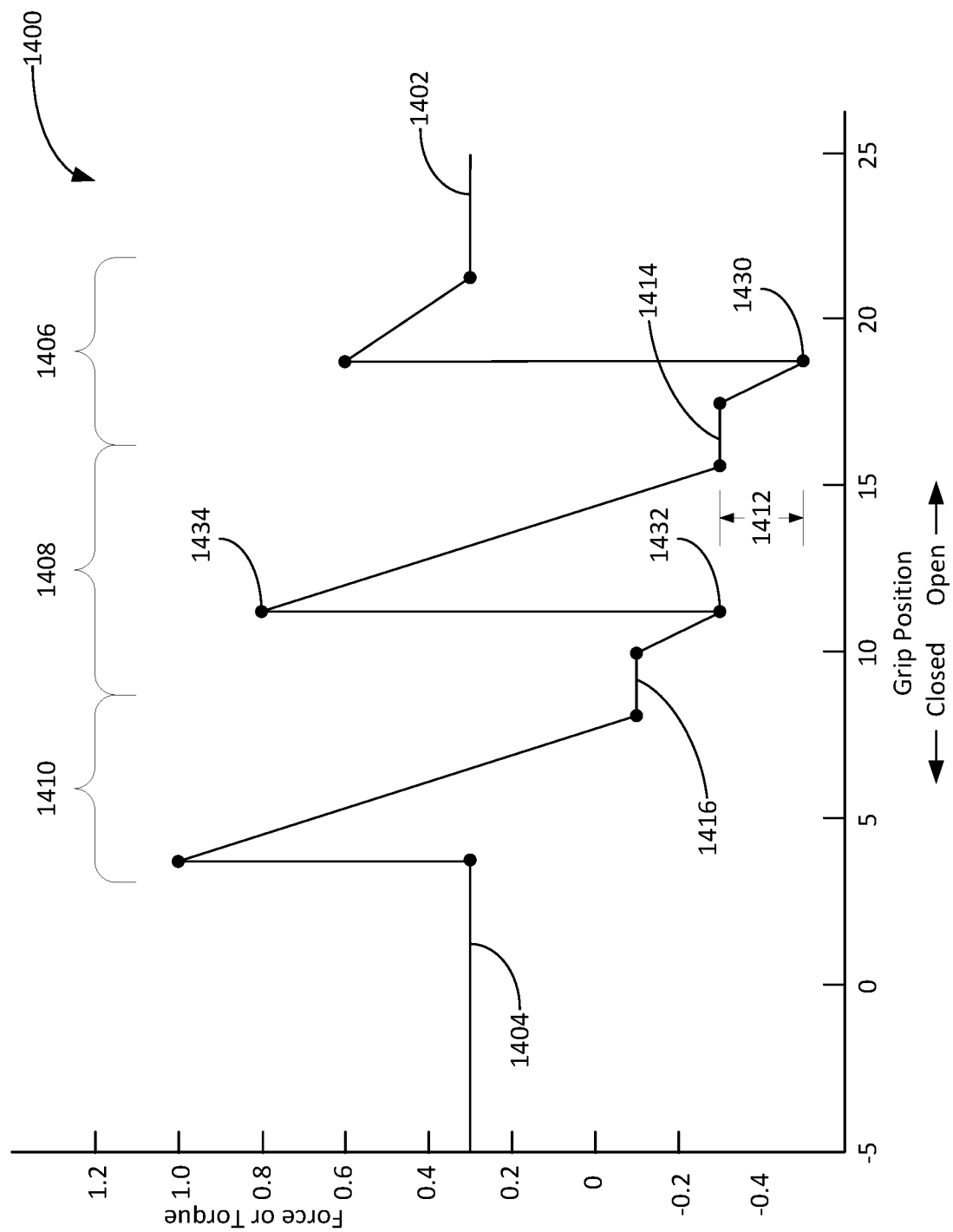

In some embodiments, a haptic profile can include a series of haptic detents that can provide a ratcheting effect. FIGS. 12-14 are diagrammatic illustrations of haptic profiles that include a series of ratcheting haptic detents, according to some embodiments. FIG. 12 illustrates a haptic profile 1200 that includes a series of haptic detents, located in regions 1206, 1208, and 1210 of haptic profile 1200. Haptic profile 1200 includes a segment 1202 that proceeds from an open grip position toward a first partially closed grip position 1228. While segment 1202 is shown with a zero slope, segment 1202 can instead have a constant, relatively shallow slope similar to segment 702 in haptic profile 700. Segment 1202 transitions into a haptic detent in region 1206. The haptic detent in region 1206 transitions into a second haptic detent in region 1208, and the haptic detent in region 1208 transitions into a third haptic detent in region 1210. The haptic detent of region 1210 transitions into segment 1204, which is another segment with a zero slope. In some embodiments, segment 1204 can have a shallow upward slope instead of a zero slope.

In some embodiments, the haptic detents in regions 1206, 1208, and 1210 hold the grip input control to respective detent positions. The haptic detent in region 1206 can hold the grip input control at a first detent position 1222 and resist further closure or opening of the grip input control away from detent position 1222. The haptic detent in region 1208 can hold the grip input control at a second detent position 1224 and resist further closure or opening of the grip input control away from detent position 1224. The haptic detent in region 1210 can hold the grip input control at a third detent position 1226 and resist further closure or opening of the grip input control away from detent position 1226.

In some embodiments, a haptic detent in a series of haptic detents can be removed from the haptic profile. For example, in haptic profile 1200, the haptic detent in region 1206 could be removed by the operator moving the input control to a position that is associated with release or removal of the haptic detent in region 1206 (e.g., detent position 1224 in the haptic detent in region 1208). Similarly, the haptic detent in region 1208 can be removed by the operator moving the input control to a position that is associated with release or removal of the haptic detent in region 1208 (e.g., detent position 1226 in the haptic detent in region 1210). In some embodiments, a position in a final haptic detent in a series of haptic detents (e.g., detent position 1226) is associated with release or removal of any and/or all prior haptic detents in the series.

In some embodiments, the peak forces or torques and/or the trough forces or torques of the haptic detents in a series of haptic detents can vary from detent to detent. FIG. 13 illustrates a haptic profile 1300 that includes a series of haptic detents, located in regions 1306, 1308, and 1310 of haptic profile 1300. Haptic profile 1300 includes a segment 1302 that proceeds from an open grip position toward a first partially closed grip position 1328. While segment 1302 is shown with a zero slope, segment 1302 can instead have a constant, relatively shallow slope similar to segment 702 in haptic profile 700. Segment 1302 transitions into a haptic detent in region 1306. The haptic detent in region 1306 includes a dead band segment 1314 of constant (e.g., zero) slope at the level of the trough force or torque, which leads into a subsequent haptic detent in region 1308. In the haptic detent in region 1308, the trough force or torque increases from the trough force or torque of the haptic detent in region 1306 by a force or torque increment 1312. The haptic detent in region 1308 also includes a dead band segment 1316 at the level of the trough force or torque. In some embodiments, dead band segment 1314 or 1316 represents a range of positions where a constant output force or torque is applied to the input control to hold the input control within the corresponding haptic detent before transitioning into an increasing force or torque portion of the next haptic detent. The haptic detent in region 1308 transitions into a subsequent haptic detent in region 1310. The haptic detent in region 1310 transitions into a segment 1304. As shown, the peak forces or torques of haptic detents in regions 1306, 1308, and 1310 also increases from detent to detent, and the amount of increase can be the same amount as increment 1312 or a different amount.

In some embodiments, the haptic detents in regions 1306 and 1308 hold the grip input control to respective detent positions. The haptic detent in region 1306 can hold the grip input control at a first detent position 1322 and resist further closure or opening of the grip input control away from detent position 1322. The haptic detent in region 1308 can hold the grip input control at a second, subsequent detent position 1324 and resist further closure or opening of the grip input control away from detent position 1324. The haptic detent in region 1308 can be removed by the operator moving the input control to a position that is associated with release or removal of the haptic detent in region 1308 (e.g., detent position 1326 in the haptic detent in region 1310). Position 1326 in the haptic detent in region 1310 is associated with release or removal of any and/or all prior haptic detents in the series (e.g., haptic detents in region 1306 and/or 1308).

While haptic profile 1300 has peak and trough forces or torques that increase from detent to detent, in some embodiments one of the two can increase from detent to detent and the other can remain the same from detent to detent. For example, in haptic profile 1300, instead of both peak and trough forces or torques increasing from detent to detent, the trough forces or torques can increase from detent to detent as shown, but the peak forces or torques can instead be the same from detent to detent. Alternatively, the peak forces or torques can increase from detent to detent as shown, but the trough forces or torques can instead be the same from detent to detent. Further alternatively, one of the peak forces or torques and the trough forces or torques can increase from detent to detent, and the other can decrease from detent to detent. In some embodiments, a trough force or torque that is deeper (e.g., further below the zero-force threshold) have a greater holding force or torque than one a trough force or torque that is less deep.

FIG. 14 illustrates another haptic profile 1400 that includes a series of haptic detents, located in regions 1406, 1408, and 1410 of haptic profile 1400. Haptic profile 1400 is similar to haptic profile 1300 in that the peak and trough forces or torques increase from detent to detent. In haptic profile 1400, however, the dead band segment for a detent is above the deepest portion (e.g., trough forces or torques 1430, 1432) of the trough force or torque for the detent. For example, the haptic detent in region 1406 includes a dead band segment 1414 that is above trough force or torque 1430 for the haptic detent in region 1406 and is located between the transition from trough force or torque 1430 for the haptic detent in region 1406 to peak force or torque 1434 for the haptic detent in region 1408. Similarly, the haptic detent in region 1408 includes a dead band segment 1416 that is above trough force or torque 1432 for the haptic detent in region 1408. The placement of dead band segments 1414 and 1416 in haptic profile 1400 as shown can provide a better mechanical feel to the operator when the operator moves the input control into the haptic detents in regions 1406 and 1408, respectively, by creating additional force or torque to assist movement of the input control past the peak at the entry into the haptic trough (e.g., peak force or torque 1434 before the entry into the haptic trough) before stabilizing in the dead band segment.

Figure 15:
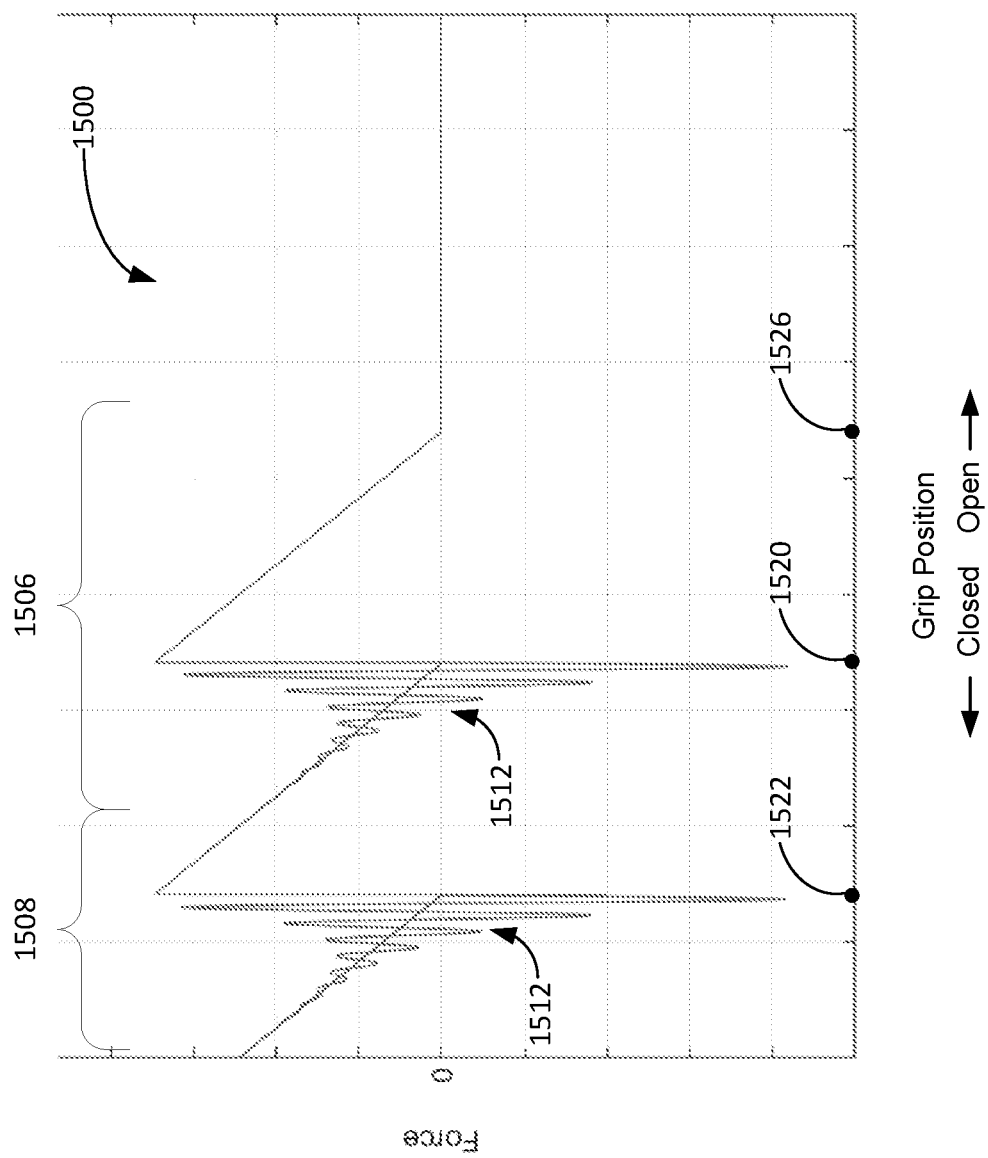
FIG. 15 is a diagrammatic illustration of a haptic profile that that includes oscillations of output force or torque at haptic detents, according to some embodiments.

In some embodiments, a haptic profile that includes one or more time-varying oscillations can be super-imposed onto another haptic profile. The time-varying oscillations are triggered based on position of the input control, but modify the another haptic profile over time. FIG. 15 is a diagrammatic illustration of a haptic profile 1500 that that includes oscillations of output force or torque at ratcheting haptic detents, according to some embodiments. Haptic profile 1500 includes haptic detents in regions 1506 and 1508, over which a haptic profile 1512 that includes time-varying oscillations can be superimposed.

When the operator moves the input control past position 1526 and toward position 1520, a haptic detent outputs an increasing force or torque to the input control as the operator further closes the input control. When the operator moves the input control past a trigger position 1520, the time-varying oscillations in haptic profile 1512 for the haptic detent in region 1506 activate. Similarly, when the operator moves the input control past trigger position 1522, the time-varying oscillations in haptic profile 1512 for the haptic detent in region 1508 activate. The output force or torque oscillates about a base force or torque that corresponds to the force or torque from the underlying haptic profile. If the grip position doesn't change then the base force or torque remains the same. However, if the operator continues to move the grip position, the base force or torque changes with the underlying haptic profile follows the haptic detent as the operator continues to close the input control. As shown, haptic profile 1512 includes oscillations that would occur if the velocity of grip closure by the operator is uniform during the closure past the trigger point for the oscillations. The oscillations can oscillate for a set amount of time after the trigger point, decrease in magnitude over time, and then stop. In some embodiments, the initial magnitude of the oscillations is based on the distance between the peak and trough of the haptic detent, and the magnitude of the oscillations decays exponentially over time. In some embodiments, a haptic profile with oscillations can be similarly super-imposed over haptic detents in a haptic profile in which the peak and/or trough forces or torques changes from detent to detent (e.g., haptic profile 1300 or 1400).

Figure 16:
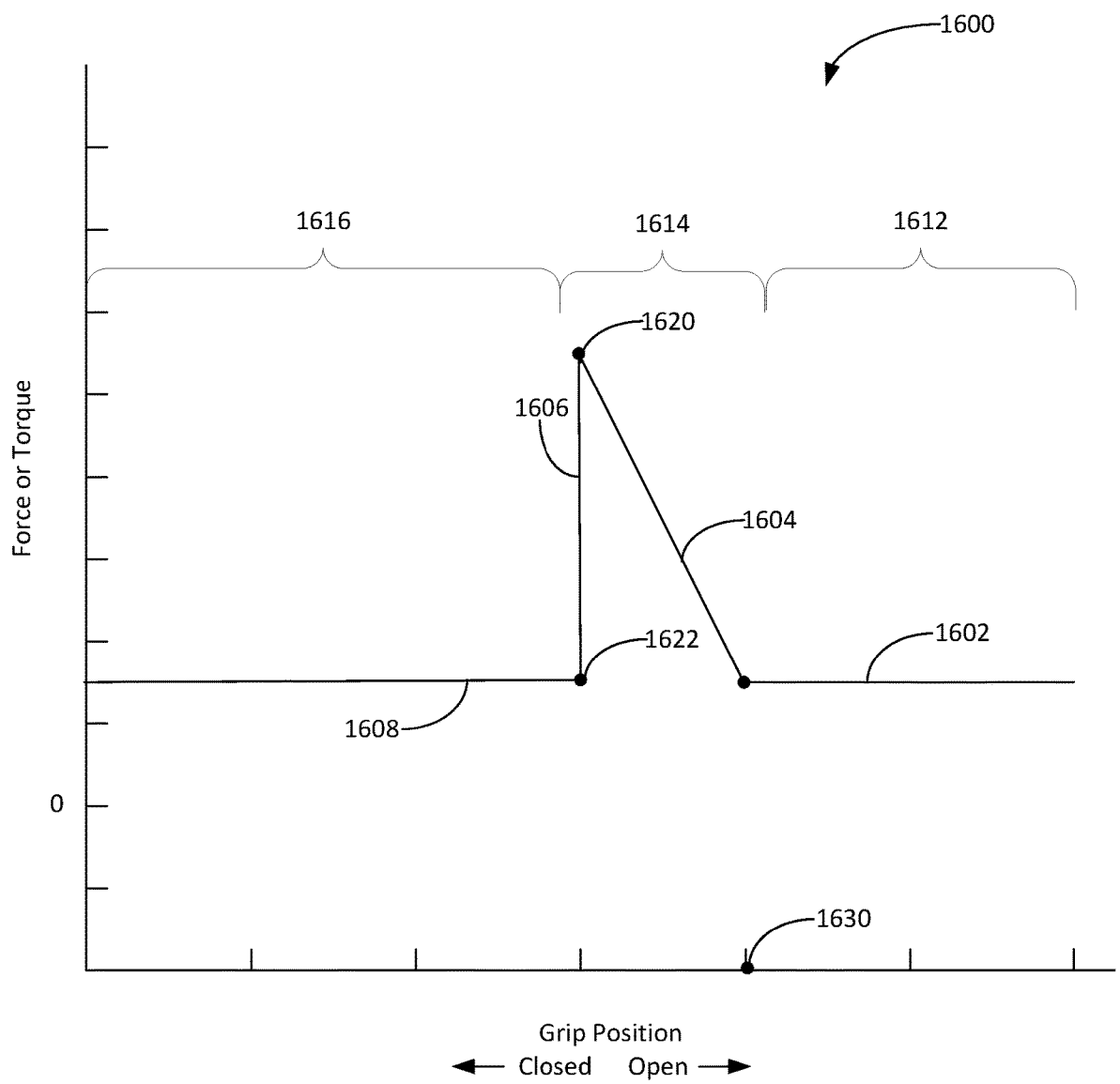
FIG. 16 is a diagrammatic illustration of a haptic profile that includes a haptic peak, according to some embodiments.

FIG. 16 is a diagrammatic illustration of a haptic profile that includes a haptic peak, according to some embodiments. In some embodiments, haptic profiles can include a haptic peak. Similar to FIG. 7, FIG. 16 shows a haptic profile 1600 as a graph along x-y axes, where the x-axis is grip position and the y-axis is a force or torque output applied by input controls 210 and/or 212 to provide haptic feedback to the hands of the operator.

Haptic profile 1600 includes a first region 1612, a second region 1614, and a third region 1616. The first region 1612 proceeds from an open grip position and proceeds along a first segment 1602 toward a first partially closed grip position 1630. While segment 1602 is shown with a zero slope, segment 1602 can have a constant, relatively shallow slope similar to segment 702 in haptic profile 700. The first region 1612 transitions to a second region 1614, which includes a haptic peak. The haptic peak includes segments 1604 and 1606. Segment 1604 represents a sharp increase in the force or torque as the grip position enters into the second region 1614 and increases to a peak or upper-bound force or torque 1620.

Segment 1604 then transitions from peak force or torque 1620 into segment 1606, which represents a sharp drop in the force or torque as the grip position indicates further closure of the grip input control, from peak force or torque 1620 to a lower force or torque 1622. While segment 1606 is illustrated as a vertical line, in some embodiments segment 1606 in the haptic profile can be an inclined segment with a steep downward slope.

Segment 1606 transitions from lower force or torque 1622 into segment 1608, which is another segment with a zero slope. In some embodiments, segment 1608 can have a shallow upward slope instead of a zero slope. Correspondingly, region 1614 transitions into a third region 1616; region 1616 corresponds to an exit from the haptic peak of region 1614.

While haptic profile 1600 shows the force or torque at the entry into the haptic peak (e.g., entry into segment 1604) as being the same as the force or torque at the exit from the haptic peak (e.g., exit from segment 1606), in some embodiments the entry force or torque and the exit force or torque for the haptic peak can be different, and one can be higher than the other. Similarly, the force or torque at entry into a haptic peak and the force or torque at exit from the haptic peak can be the same or different.

In some embodiments, haptic barrier peak 708 in haptic profile 700 is similar to the haptic peak in region 1614 in haptic profile 1600. Haptic barrier peak 708 includes a sharp increase in force or torque to a peak force or torque and a sharp decrease from same, as with the haptic peak formed by segments 1604 and 1606 in region 1614.

In some embodiments, a haptic peak can be implemented to provide feedback regarding a state or mode change, and/or to provide an alert to the operator. For example, a haptic peak could be implemented at a grip position that is configured to trigger a change in the state or mode of the input control and/or the instrument. The haptic peak provides a barrier that the operator overcomes in order to activate the state or mode change. For example, when the operator moves the input control past the haptic peak (e.g., closes the grip input control from region 1612, through region 1614, to region 1616), a state or mode change of the input control and/or the instrument would be activated, and the output force or torque output to the operator through region 1614 provides the operator feedback on the state or mode change. In a specific example, haptic barrier peak 708, described above with reference to FIG. 7, is an example of a haptic peak providing feedback regarding a state or mode change, and/or to triggering the state or mode change (e.g., the above-described state or mode change associated with Vessel Sealer Extend and SynchroSeal). Accordingly, a haptic peak can serve to restrict further movement of the input control until the operator wants to activate the state or mode change.

In a specific example, a haptic peak can be implemented in conjunction with a stapler instrument. A haptic peak can be implemented to provide resistance to the operator as the operator is operating a stapler via the input control to clamp onto a material. The operator would move the input control through the haptic peak to cause the stapler to fire (e.g., a staple or other fastener) into the material. Accordingly, the haptic peak can provide feedback when the clamping of the stapler onto the material is successful and the firing of staples is initiated.

In some embodiments, a difference between a haptic peak and a haptic detent is that the haptic peak, unlike the haptic detent, does not include a force or torque that is below the zero-force threshold. A haptic peak can be implemented to urge the operator to commit to a state or mode change by moving the input control through the haptic peak (e.g., by closing the grip input control from region 1612 through region 1614 into 1616) or to forgo that change by moving the input control away from the haptic peak (e.g., by not closing the grip input control through region 1614 from region 1612 and instead opening the grip input control back into region 1612). Also, in some embodiments a haptic peak is not intended to hold the input control or the instrument to a position. Accordingly, after moving the input control through a haptic peak, if the operator releases the grip input control, the grip input control can return to a fully open position due the haptic forces or torques applied by the haptic profile.

In some embodiments, the haptic peak in region 1614 of haptic profile 1600 can be dynamically modified. Control system 610 can dynamically modify the haptic peak region in response to a state or mode of the input control and/or the instrument, and/or in response to an additional input made by the operator (e.g., the operator steps on an input foot pedal). The modification can include widening or narrowing region 1614 and correspondingly the range of grip positions covered by the haptic peak (e.g., by changing the slopes of segments 1604 and/or, 1606). The modification can additionally or alternatively include shifting region 1614 leftward or rightward along the grip positions axis, thereby associating the haptic peak with different grip positions.

In some embodiments, a haptic peak can be active in one direction of motion of the input control and not active in the other, opposite direction of motion of the input control. For example, the haptic peak in region 1614 can be active in the closing direction (e.g., closing the grip input control), but is removed in the opening direction (e.g., opening the grip input control) and replaced with another output profile (e.g., a linear component).

Figure 17:
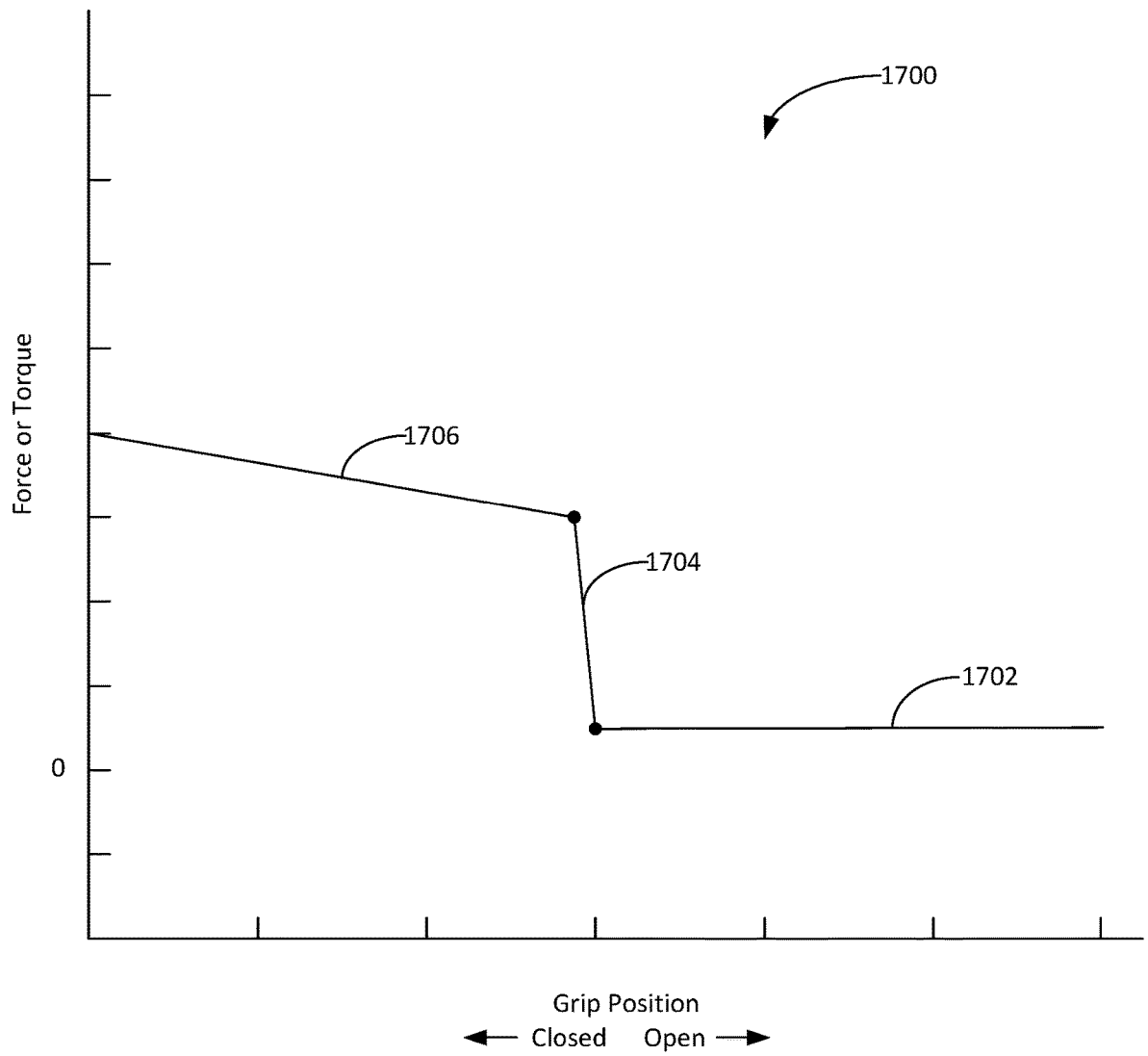
FIG. 17 is a diagrammatic illustration of a haptic profile that includes a haptic wall, according to some embodiments.

FIG. 17 is a diagrammatic illustration of a haptic profile 1700 that includes a haptic wall, according to some embodiments. In some embodiments, haptic profiles can include a haptic wall. A haptic wall can be a linear component of a steep slope (e.g., vertical or nearly vertical) corresponding to a sharp increase or decrease in output force or torque as the operator closes the grip input control. As shown in FIG. 17, a haptic profile 1700 includes three segments 1702, 1704, and 1706. Segments 1702 and 1706 have constant (zero or non-zero) slopes that are relatively shallow. Segment 1702 transitions into a segment 1704 that is a haptic wall; segment 1704 has a steep, nearly vertical slope. Segment 1704 then transitions into segment 1706. The haptic wall of segment 1704 accordingly provides another type of haptic barrier that resists movement of the input control.

In some embodiments, a haptic wall can be implemented for the closing direction or the opening direction by placing the wall on the positive site or the negative side of the zero-force or torque threshold. For example, segment 1704 as shown in FIG. 17 is on the positive side of the zero-force or torque threshold. Accordingly, the corresponding haptic wall outputs a force or torque that resists closure of the grip input control. On the other hand, a wall that is on the negative side of the zero-force or torque threshold (e.g., positioned below zero force or torque on the x-axis as shown) outputs a force or torque that resists opening of the grip input control.

Figure 18A:
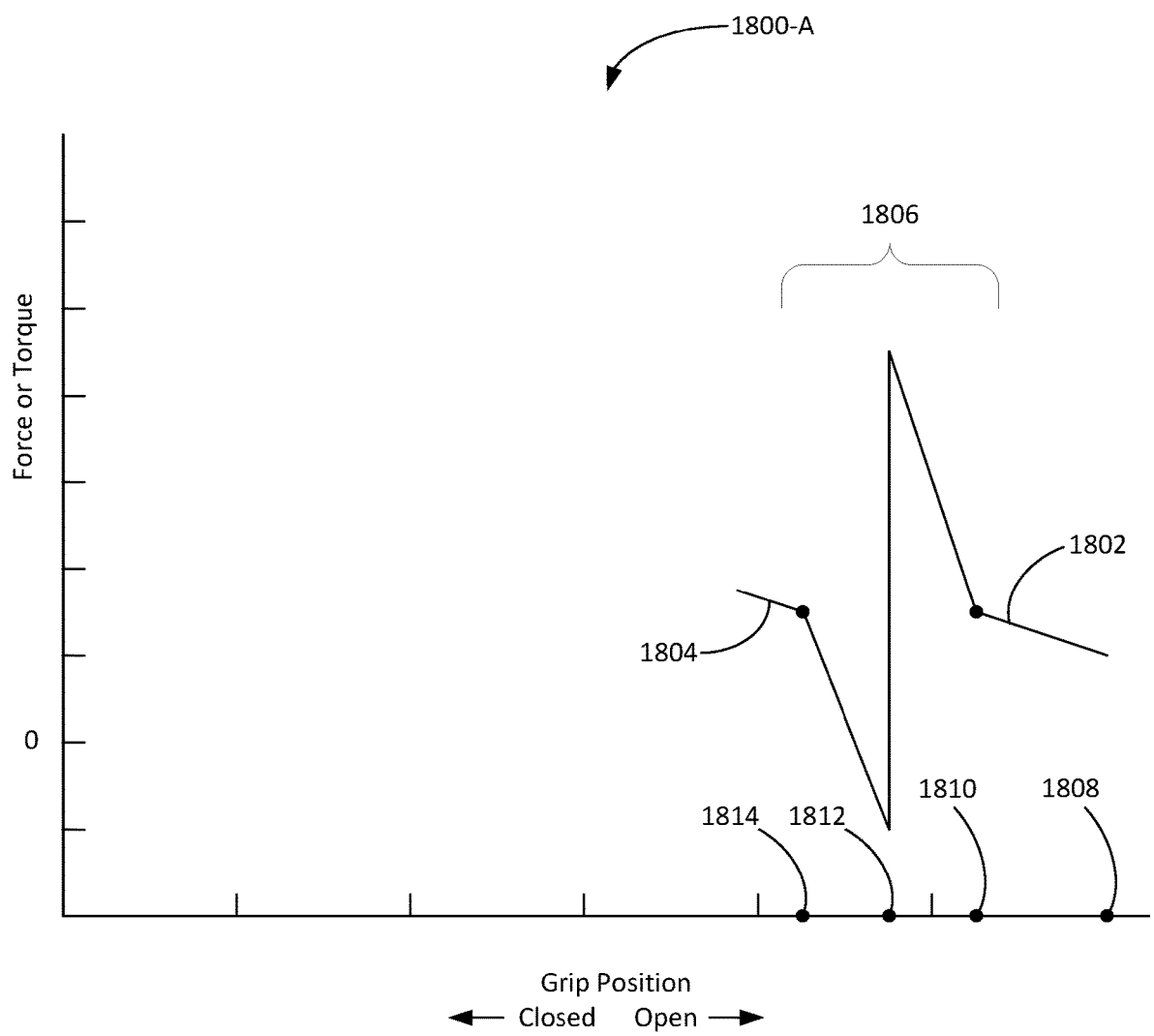
FIGS. 18A-18C are diagrammatic illustrations of a multi-stage haptic profile, according to some embodiments.
Figure 18B:
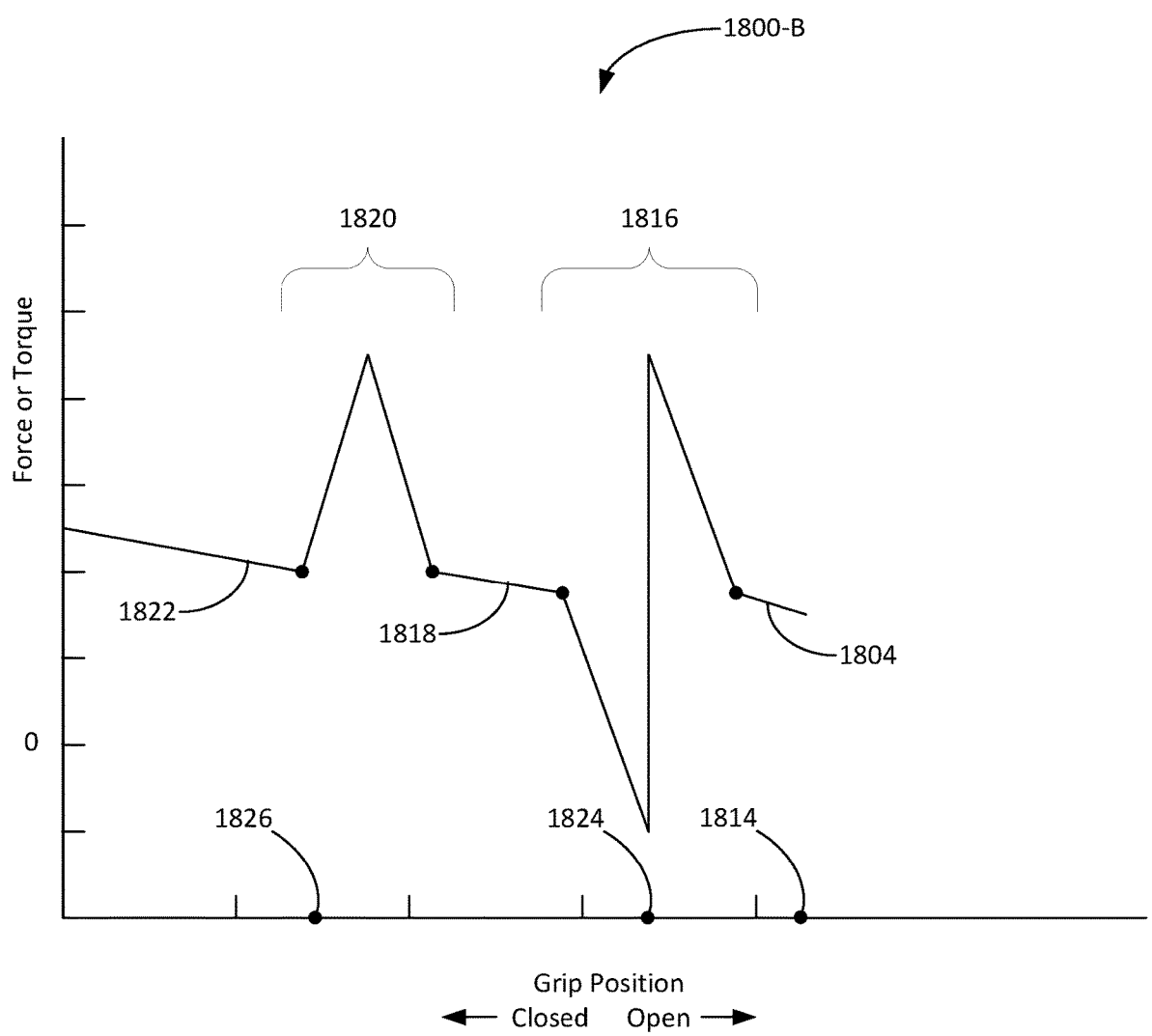
Figure 18C:
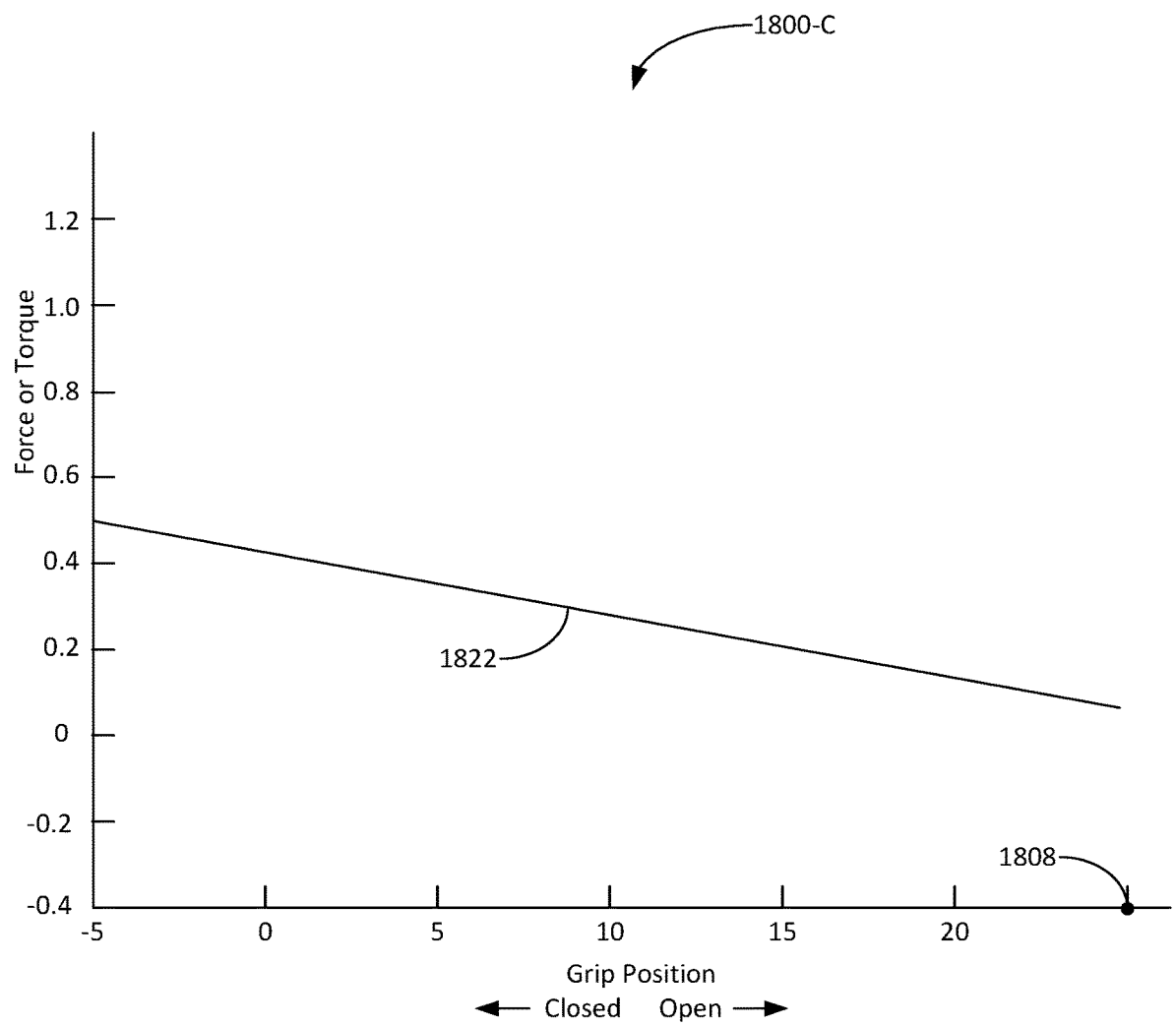

FIGS. 18A-18C are diagrammatic illustrations of a multi-stage haptic profile, according to some embodiments. In some embodiments, a haptic profile can have multiple stages, and the haptic profile can take different forms depending on the stage. In some embodiments, the multiple stages correspond to different states or modes of the input control and/or the instrument being controlled by the input control. In a specific example, a multi-stage haptic profile implements a 3-stage grip locking mechanism for the instrument.

FIG. 18A illustrates a first stage 1800-A of a haptic profile 1800. First stage 1800-A corresponds to a neutral state, beginning from a fully open position 1808. First stage 1800-A includes a segment 1802 that proceeds from fully open grip position 1808 toward a first partially closed grip position 1810. Segment 1802 transitions into a haptic detent in region 1806. The haptic detent in region 1806 can hold the input control at detent position 1812. When the operator moves the input control past the haptic peak in region 1806 to a second partially closed grip position 1814, haptic profile 1800 transitions into a second stage 1800-B, in which the haptic detent in region 1806 transitions into segment 1804 and is removed.

FIG. 18B illustrates a second stage 1800-B of haptic profile 1800. Second stage 1800-B includes segment 1804 along which the operator can continue to close the grip input control. As the operator further closes the grip input control, segment 1804 transitions into a haptic detent in region 1816, which holds the input control at detent position 1824. The haptic detent in region 1816 transitions into segment 1818, which then transitions into a haptic peak in region 1820. As the operator further closes the grip input control haptic peak in region 1820, the haptic peak in region 1820 transitions into a segment 1822. In response to the operator closing the grip input control past the haptic peak in region 1820 to position 1826, haptic profile 1800 transitions into a third stage 1800-C, in which the haptic detent in region 1816 and haptic peak in region 1820 are removed.

FIG. 18C illustrates a third stage 1800-C of haptic profile 1800. Third stage 1800-C corresponds to an unlocked state. Third stage 1800-C includes a segment 1822, with a relatively shallow slope, along which the operator can close or open the grip input control. The operator can open the grip input control back to position 1808. When the input control position reaches position 1808, haptic profile 1800 transition back to first stage 1800-A.

As shown above, a haptic profile can have different forms depending on the stage, and the current stage is based on the input control position and any state or mode that may be activated or set based on the input control position. More generally, a haptic profile can dynamically change forms (e.g., modify, add, or remove an output profile within; change forms) based on input control position and optionally one or more other parameters.

In some embodiments, an output profile can have different output forces or torques based on the instrument being controlled via the input control. That is, for the same overall haptic profile applied to control different instruments, an output profile within the overall haptic profile can have different maximum or minimum output forces or torques (e.g., peak or trough force or torque, respectively) corresponding to a variable haptic stiffness based on the instrument. The variable output force or torque can be achieved by varying a height and/or slope of the haptic profile (e.g., slope of a linear component, value of the peak force or torque).

One or more features described herein can be used with other types of input controls. For example, ungrounded input controls can be used, which are free to move in space and disconnected from ground. In some examples, one or more handles similar to handle 302 and/or grip members 306 can be coupled to a mechanism worn on a hand of the operator and which is ungrounded, allowing the operator to move grips freely in space. In some examples, the positions of the grips relative to each other and/or to other portions of the handle can be sensed by a mechanism coupling the grips together and constraining their motion relative to each other. Some embodiments can use glove structures worn on the hand of the operator. Furthermore, some embodiments can use sensors coupled to other structures to sense the grips within space, e.g., using video cameras or other sensors that can detect motion in 3D space. Some examples of ungrounded input controls are described in U.S. Pat. Nos. 8,543,240 and 8,521,331, both incorporated herein by reference. The detection of operator touch described herein can be used with ungrounded input controls. For example, vibration can be applied to a handle (e.g., grip) by one or more actuators coupled to the handle, and this vibration can be sensed similarly as described herein to determine if the handle is contacted or grasped by the operator. In some embodiments, input controls other than grip input controls, such as a single-finger input control associated with an instrument (e.g., input control for a needle driver, a hooking instrument, a suction irrigator, or an energy instrument). For example, a haptic detent could be implemented to facilitate fixing of a position of an instrument by the operator (e.g., to maintain progress of movement of the instrument toward the desired destination).

In various embodiments and more generally, a haptic profile can define forces and/or torques to be output and/or applied on the input control based on one or more parameters. That is, a haptic profile can specify forces and/or torques for applying haptic feedback on the input control and associated parameter dependencies that control when and/or where along a degree of freedom of the input control those forces and/or torques are to be output. Various examples of haptic profiles and associated parameter dependencies are described below.

In some embodiments, a haptic profile can be piecewise. That is, a haptic profile can define forces and/or torques that are to be output and/or applied at different predefined segments or portions of the haptic profile; a haptic profile can include multiple segments or portions, each of which having a haptic profile for a corresponding range of positions of the input control. For example, a haptic profile can include multiple segments that are linear but have different slopes. As an example, haptic profile 1100 includes piecewise portions, respectively corresponding to regions 1112, 1114, and 1116, that define the output forces and/or torques as the operator operates input control 210 and/or 212 through those regions. Each of portions corresponding to regions 1112, 1114, and 1116 are respective haptic profiles for their respective region corresponding range of grip positions. In some embodiments, one portion can transition into another portion with continuity or discontinuity. Further, in some embodiments, different portions can have similar or different types of output profiles. For example, one portion can have a haptic peak similar to haptic barrier peak 708 or the haptic peak in haptic profile 1600, and another portion can have a sloped linear component.

In some embodiments, a portion of an overall haptic profile can be static or dynamic. A static portion remains the same throughout manipulation of the input control by the operator. A dynamic portion can be modified, added, or removed during manipulation of the input control by the operator based on one or more parameters or criteria. For example, a dynamic portion can be modified, added, or removed depending on one or more parameters or criteria including but not limited to a direction of movement along the degree of freedom of the input control, an input control position along the degree of freedom, an event, a state, a mode, and an additional user input external to the input control. In some embodiments, a haptic profile can include a base haptic profile and one or more dynamic haptic profile that can be added or removed dynamically. For example, in haptic profile 1500, a haptic profile 1512 of time-varying oscillations that can be added (e.g., super-imposed) onto a base profile that includes haptic detents in regions 1506 and 1508. In a specific example, the operator can make an input (e.g., step on a foot pedal), and in response a haptic detent can be modified (e.g., resized, shifted).

In some embodiments, haptic profiles can be super-imposed on one another. In particular, one haptic profile can be super-imposed on another haptic profile, and both haptic profiles can be concurrently active when the position of the input control is at a position associated with the super-imposed haptic profiles. For example, in haptic profile 1500, haptic profile 1512 can be super-imposed on any portion of a haptic profile.

In some embodiments, a haptic profile can be position dependent. A haptic profile can include one or more portions that are triggered or is active based on the position of the input control along the degree of freedom of the input control (e.g., how much grip input control 300 or 400 are closed). For example, in haptic profile 1800, haptic profile 1800 can take on different forms corresponding to different stages 1800-A thru 1800-C depending on how far the operator has closed the grip input control.

In some embodiments, a haptic profile can have multiple triggering positions or regions. For example, haptic profile 1800 has different positions that trigger transitions to a different stage. In stage 1800-A, position 1814 triggers a transition from stage 1800-A to stage 1800-B. In stage 1800-B, position 1826 triggers a transition from stage 1800-B to stage 1800-C. In stage 1800-C, position 1808 triggers a transition from stage 1800-C back to stage 1800-A.

In some embodiments, a haptic profile can be velocity dependent. A haptic profile can include one or more portions that are triggered or is active based on the speed or velocity at which the operator changes the position of the input control along the degree of freedom of the input control (e.g., how fast the operator opens or closes grip input control 300 or 400). That is, the velocity of the input control movement along the degree of freedom is a parameter dependency of the haptic profile. For example, in haptic profile 700, haptic barrier peak 708 can have a higher peak force or torque if the operator is closing grip input control 300/400 at a speed that is above a threshold than if the operator is closing grip input control 300/400 at a speed that is below the threshold.

In some embodiments, a haptic profile can be time dependent. A haptic profile can include one or more portions that are triggered or is active based on the amount of time elapsed. In some embodiments, a portion that is active based on the amount of time elapsed can be triggered based on other parameters (e.g., position) but remain active based on the amount of time elapsed. For example, oscillation haptic profile 1512 can be triggered based on the position of the input control, but remain active (e.g., the force continues to oscillate) for a predefined amount of time. The oscillations stop when the amount of time has elapsed, regardless of the input control position, or when the input control position has moved beyond a range of positions associated with haptic profile 1512. As another example, if the input control remains at a particular position or a particular range of positions associated with a particular haptic profile (e.g., a position or range of positions associated with a haptic detent or haptic peak) for more than a threshold amount of time, the haptic detent or haptic peak can be modified (e.g., further increasing or decreasing the haptic force or torque) to give feedback to the operator that the position has been held for more than the threshold amount of time and that the operator should commit to moving the input control in either direction.

In some embodiments, one or more properties of the haptic profile can be modified based on the time dependency. The modifiable properties of a haptic profile can include, without limitation, a slope of a portion, a position or range of positions that a portion of the haptic profile covers, a magnitude or sign of a force or torque in the profile, a level of a peak force or torque, and/or a level of a trough force or torque. In a specific example, if the input control position remains at the same position for more than a threshold amount of time, the output force or torque at that position can be changed dynamically to a different output force or torque.

In some embodiments, a haptic profile can be state, mode, or event dependent. A haptic profile can include one or more portions that are triggered or is active based on a state and/or mode of the input control and/or the computer-assisted device (e.g., an instrument), or on a triggering event. As an operator moves the input control along a degree of freedom of the input control, a state or mode of the input control and/or the computer-assisted device can change. Additionally, one or more triggering events can occur during operation of the input control (e.g., the operator steps on an input pedal). In response to these state or mode changes or triggering events, a portion in the haptic profile can be modified, added, or removed. In one example, haptic profile 1800 is state dependent; haptic profile 1800 can take on different forms depending on the current state (neural, locked, unlocked), and the state can be changed via operation of the input control. Furthermore, in some embodiments, the haptic profile can be specific to the instrument and/or a current operating mode of the instrument, where the operating mode can be set or modified by other inputs external to the input control (e.g., a foot pedal).

In some embodiments, a haptic profile can be dependent on a direction of motion of the input control along the degree of freedom. A portion of the haptic profile can be modified, added, or removed based on whether the operator is, for example, closing or opening the grip input control. In a specific example, in haptic profile 1600, when the operator is closing the grip input control on segment 1604 of the haptic peak in region 1614, the operator can continue through the haptic peak (e.g., by further closing the grip input control) or back off to segment 1602 (e.g., by opening the grip input control). If the operator backs off from the haptic peak, segment 1604 and/or segment 1602 can be modified to reduce the output force or torque as the operator opens the grip input control.

In some embodiments, the input control can have multiple degrees of freedom in two or three dimensions, and a respective haptic profile can be applied to each of two or more of the degrees of freedom. The haptic profiles applied to the degrees of freedom can be applied independently of each other or in a coupled manner. For example, an input control with x, y, and z degrees of freedom can have a haptic profile for each of those degrees of freedom. As another example, when the input control is moved along one degree of freedom, output force or torque can be increased on the other degrees of freedom in order to reduce the likelihood of jostling of the input control along the other degrees of freedom.

It should be appreciated that while the dependencies described above are described individually, a haptic profile can depend on any number of the above dependencies. Any combination of the above dependencies can be applied to a haptic profile.

Figure 19:
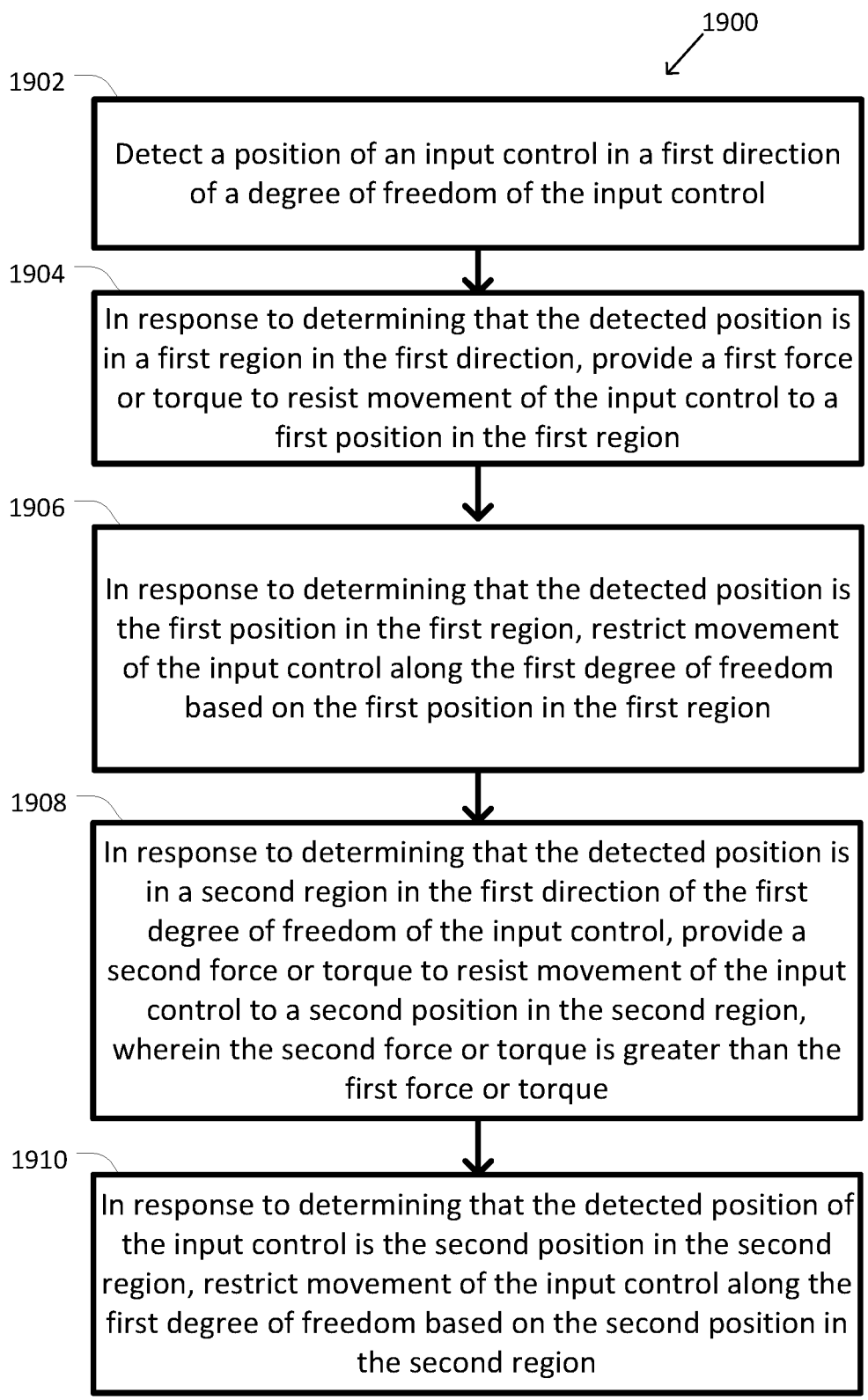
FIG. 19 is a flow diagram of method steps for providing multiple haptic detents at an input control, according to some embodiments.

FIG. 19 is a flow diagram of method steps for providing multiple haptic detents at an input control, according to some embodiments. Although the method steps are described with respect to portions of FIGS. 1-18C, persons skilled in the art will understand that any system configured to perform the method steps, in any order, falls within the scope of the various embodiments. In some embodiments, steps 1902-1910 can be used to implement the haptic profiles of FIGS. 12-14. In some embodiments, one or more of the steps 1902-1910 of method 1900 may be implemented, at least in part, in the form of executable code stored on one or more non-transient, tangible, machine readable media that when run by one or more processors (e.g., processor 612) may cause the one or more processors to perform one or more of the steps 1902-1910.

As shown, method 1900 begins at step 1902, where a control system 610 detects a position of an input control in a first direction of a degree of freedom (DOF) of the input control. For example, mode control module 640 receives control signals C1 thru Cx indicating the position of an input control (e.g., grip input control 300 or 400) of the input control 210 and/or 212 along the close/open degree of freedom, where the grip input control closes or opens along the close/open degree of freedom based on a force or torque applied to the grip input control by an operator. In some embodiments, the control system 610 directly detects the position of the grip input control; the control signals C1 thru Cx directly indicates the grip position, and the control system 610 need not detect the amount and/or direction of force or torque applied to the grip input control by the operator to detect the grip position. In particular, control system 610 can detect the grip position in the closing direction.

At step 1904, in response to determining that the detected position is in a first region in the first direction of the first degree of freedom of the input control, control system 610 provides a first output force or torque to resist movement of the input control to a first position in the first region. For example, when control system 610 applies haptic profile 1300 to the input control and determines the position of the input control, in the closing direction, to be in region 1306 of haptic profile 1300, then control system 610 could activate the haptic detent in region 1306 to resist movement of the input control to detent position 1322.

At step 1906, in response to determining that the detected position of the input control is the first position in the first region, control system 610 restricts movement of the input control along the first degree of freedom based on the first position in the first region. For example, when the operator has closed the grip input control to or beyond detent position 1322, control system 610 uses haptic feedback to hold the input control to position 1322. Control system 610 restricts movement of the input control in either direction away from position 1322 (e.g., the grip input control resists opening past position 1322).

At step 1908, in response to determining that the detected position is in a second region in the first direction of the first degree of freedom of the input control, control system 610 provides a second output force or torque to resist movement of the input control to a second position in the second region, where the second output force or torque is larger than the first output force or torque. For example, when control system 610 determines the position of the input control, in the closing direction, to be in region 1308 of haptic profile 1300, then control system 610 could activate the haptic detent in region 1308 to resist movement of the input control to detent position 1324.

At step 1910, in response to determining that the detected position of the input control is the second position in the second region, control system 610 restricts movement of the input control along the first degree of freedom based on the second position in the second region. For example, when the operator has closed the grip input control to or beyond detent position 1324, control system 610 uses haptic feedback to hold the input control to detent position 1324. In some examples, the output force or torque to hold the input control at the detent position can be different than the force or torque to hold the input control of an earlier detent position, such as is shown in FIGS. 13 and 14, or the same force or torque, such as is shown in FIG. 12. Control system 610 restricts movement of the input control in either direction away position 1324 (e.g., the grip input control resists opening past position 1324).

Figure 20:
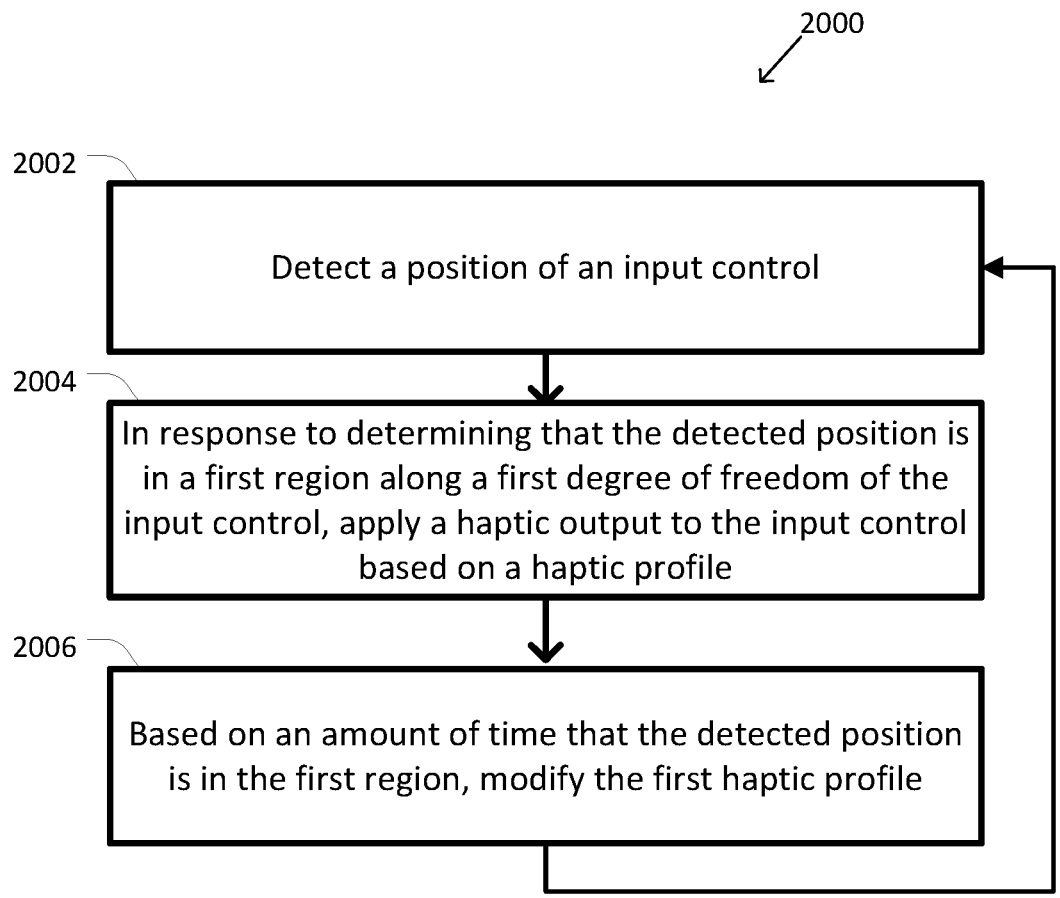
FIG. 20 is a flow diagram of method steps for providing a time-based output at an input control, according to some embodiments

FIG. 20 is a flow diagram of method steps for providing a time-based output at an input control, according to some embodiments. Although the method steps are described with respect to portions of FIGS. 1-18C, persons skilled in the art will understand that any system configured to perform the method steps, in any order, falls within the scope of the various embodiments. In some embodiments, one or more of the steps 2002-2006 of method 2000 may be implemented, at least in part, in the form of executable code stored on one or more non-transient, tangible, machine readable media that when run by one or more processors (e.g., processor 612) may cause the one or more processors to perform one or more of the steps 2002-2006.

As shown, method 2000 begins at step 2002, where a control system 610 detects a position of an input control. For example, mode control module 640 receives control signals C1 thru Cx indicating the position of an input control (e.g., grip input control 300 or 400) of the input control 210 and/or 212 along the close/open degree of freedom, where the grip input control closes or opens along the close/open degree of freedom based on a force or torque applied to the grip input control by an operator. In some embodiments, the control system 610 directly detects the position of the grip input control; the control signals C1 thru Cx directly indicates the grip position, and the control system 610 need not detect the amount and/or direction of force or torque applied to the grip input control by the operator to detect the grip position.

At step 2004, in response to determining that the detected position is in a first region along a first degree of freedom of the input control, controls system 610 applies a haptic output, which includes a force or torque, to the input control based on a haptic profile. For example, in haptic profile 1500, when the position in the closing direction is determined to be in region 1506, in particular between positions 1526 and 1520, control system 610 can apply an output force or torque to the input control according to the haptic detent in region 1506. As another example, in haptic profile 1600, when the input control position in the closing direction is determined to be in region 1614, control system 610 can apply an output force or torque to the input control according to the haptic peak in region 1614.

At step 2006, based on an amount of time that the detected position is in the first region, control system 610 modifies the first haptic profile. In particular, control system 610 modifies one or more properties of the first haptic profile. The one or more properties can include, without limitation, slope, position or range of positions, magnitude of the force or torque, peak force or torque level, and trough force or torque level. For example, in haptic profile 1500, in response to the operator closing the grip input control to position 1520, haptic profile 1512 is triggered and the output force or torque oscillates according to haptic profile 1512. One or more properties of haptic profile 1512 are modified as time elapses while the input control position remains in region 1506; the oscillations associated with oscillation output profile 1512 can decay with time or last until a threshold amount of time has elapsed since the start of the oscillations, even if the input control position remains the same. As another example, in haptic profile 1600, if the input control position in the closing direction remains on segment 1604 for more than a threshold amount of time, control system 610 can change the output force or torque associated with segment 1604 (e.g., increasing the magnitude of the force or torque) to give feedback to the operator that the operator should commit to moving the input control out of region 1614 in either direction. In some embodiments, the modification can include, for the same input control position, changing the output force or torque (e.g., by changing the magnitude and/or the sign). Method 2000 can return to step 2002, where control system 610 can detect an updated position of the input control and apply a haptic output accordingly.

In sum, a grip input control for operating a computer-assisted device can include a haptic barrier along a degree of freedom of the grip input control. A processor can detect a position of the grip input control along the degree of freedom. When the position is in a certain region along the degree of freedom, the processor provides a haptic barrier that resists movement of the grip input control through that region. On either side of that haptic barrier region, the processor operates the computer-assisted device (e.g., an instrument) according to different modes. The processor can provide haptic feedback on the grip input control, including haptic feedback associated with the haptic barrier, via an actuator mechanism in the grip input control. An amount of haptic feedback for the haptic barrier region can be higher than the amount of haptic feedback on either side of the haptic barrier region. The haptic feedback can further follow a haptic profile that includes different amounts of haptic feedback based on the position of the grip input control.

Additionally, in some embodiments, a haptic profile can include multiple portions associated with restrictions on movement of the input control to certain positions. A haptic profile can include a first portion that holds the input control to a first position, and a second portion that holds the input control to a second position. The first portion can provide a first output force or torque to hold the input control at a position associated with the first portion, and the second portion can provide a second, same, smaller, or larger output force or torque to hold the input control at a position associated with the second portion.

Further, in some embodiments, a haptic profile can be modified based on an amount of time that the position of the input control is located in a certain position or range of positions. The haptic profile can be modified by modifying one or more properties of the haptic profile. The modifiable properties can include a slope of a portion of the haptic profile, a magnitude of the output force or profile, and/or a position or range of positions of the input control with which a portion of the haptic profile is associated.

At least one advantage and technical improvement of the disclosed techniques is that a haptic barrier can be flexibly implemented on a grip input control. The haptic barrier can be used to provide increased resistance as an operator attempts to further close the grip input control, such as may be used to provide distinct operating regions for the grip input control. Another advantage and technical improvement of the disclosed techniques are that the operator obtains haptic feedback when operation of the grip input control changes the functionality of the instrument and/or the end effector. Accordingly, the situational awareness of the operator when controlling the instrument and/or end effector is improved. A further advantage is that haptic feedback can be generated based on time, state, mode, and other parameters or dependencies. Accordingly, complex haptic profiles can be created, and haptic feedback can be provided based on complex haptic profiles, without using complex mechanical structures, such as complex arrangements of mechanical springs. These technical advantages provide one or more technological advancements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-assisted device, comprising:
   a grip input control;
   a repositionable arm configured to support an instrument; and
   one or more processors configured to:
      detect a position of the grip input control in a first direction of a degree of freedom of the grip input control, the degree of freedom having a first region, a second region, and a third region between the first region and the second region;
      in response to determining that the detected position is in the first region, operate the instrument according to a first operating mode;
      in response to determining that the detected position is in the third region, provide a haptic barrier to resist movement of the grip input control through the third region; and
      in response to determining that the detected position is in the second region, operate the instrument according to a second operating mode different from the first operating mode.

2. The computer-assisted device of claim 1, wherein the degree of freedom is an open and close degree of freedom between first and second grip members of the grip input control.

3. The computer-assisted device of claim 1, wherein the position comprises an angle between first and second grip members of the grip input control.

4. The computer-assisted device of claim 1, wherein:
   the third region corresponds to a first position of the grip input control; and
   the first region and the second region are adjacent to each other at the first position.

5. The computer-assisted device of claim 1, wherein:
   the grip input control comprises an actuator; and
   the one or more processors are further configured to actuate the actuator to provide haptic feedback on the grip input control, the haptic feedback comprising force or torque resisting further closure of first and second grip members of the grip input control.

6. The computer-assisted device of claim 1, wherein:
   the grip input control comprises an actuator;
   the one or more processors are further configured to actuate the actuator to provide haptic feedback on the grip input control; and
   an amount of haptic feedback in the third region is higher than an amount of haptic feedback in the first region or the second region adjacent to the third region.

7. The computer-assisted device of claim 1, further comprising:
   an input device;
   wherein to operate the instrument according to the first operating mode, the one or more processors are configured to: activate a first function of the instrument in response to activation of the input device; and
   wherein to operate the instrument according to the second operating mode, the one or more processors are configured to activate a second function of the instrument different from the first function in response to activation of the input device.

8. The computer-assisted device of claim 1, wherein:
   the instrument comprises a vessel sealer tool;
   to operate the instrument according to the first operating mode, the one or more processors are configured to activate a coagulation function of the vessel sealer tool; and
   to operate the instrument according to the second operating mode, the one or more processors are configured to activate a sealing function of the vessel sealer tool.

9. The computer-assisted device of claim 1, wherein:
   the instrument comprises a syncing tool;
   to operate the instrument according to the first operating mode, the one or more processors are configured to activate a coagulation function of the syncing tool in response to activation of a first input device; and
   to operate the instrument according to the second operating mode, the one or more processors are configured to:
      activate a sealing function of the syncing tool in response to activation of the first input device; and activate a syncing function of the syncing tool in response to activation of a second input device different from the first input device.

10. The computer-assisted device of claim 1, wherein;
the first direction is a closing direction of the degree of freedom between first and second grip members of the grip input control; and
the haptic barrier is not provided in the third region when the grip input control is being moved in an opening direction of the degree of freedom between the first and second grip members.

11. A method, comprising:
detecting a position of a grip input control in a first direction of a degree of freedom of the grip input control, the degree of freedom having a first region, a second region, and a third region between the first region and the second region;
in response to determining that the detected position is in the first region, operating an instrument supported on a repositionable arm according to a first operating mode;
in response to determining that the detected position is in the third region, providing a haptic barrier to resist movement of the grip input control through the third region; and
in response to determining that the detected position is in the second region, operating the instrument according to a second operating mode different from the first operating mode.

12. The method of claim 11, wherein the degree of freedom is an open and close degree of freedom between first and second grip members of the grip input control.

13. The method of claim 11, wherein:
the third region corresponds to a first position of the grip input control; and
the first region and the second region are adjacent to each other at the first position.

14. The method of claim 11, wherein:
the grip input control comprises an actuator;
the method further comprises actuating the actuator to provide haptic feedback on the grip input control; and
an amount of haptic feedback in the third region is higher than an amount of haptic feedback in the first region or the second region adjacent to the third region.

15. The method of claim 11, wherein:
the instrument comprises a vessel sealer tool;
operating the instrument according to the first operating mode comprises activating a coagulation function of the vessel sealer tool; and
operating the instrument according to the second operating mode comprises activating a sealing function of the vessel sealer tool.

16. The method of claim 11, wherein:
the instrument comprises a syncing tool;
operating the instrument according to the first operating mode comprises activating a coagulation function of the syncing tool in response to activation of a first input device; and operating the instrument according to the second operating mode comprises:
activating a sealing function of the syncing tool in response to activation of the first input device; and
activating a syncing function of the syncing tool in response to activation of a second input device different from the first input device.

17. The method of claim 11, wherein:
the first direction is a closing direction of the degree of freedom between first and second grip members of the grip input control; and
the haptic barrier is not provided in the third region when the grip input control is being moved in an opening direction of the degree of freedom between the first and second grip members.

18. One or more non-transitory machine-readable media comprising a plurality of machine-readable instructions which when executed by one or more processors are adapted to cause the one or more processors to perform a method comprising:
detecting a position of a grip input control in a first direction of a degree of freedom of the grip input control, the degree of freedom having a first region, a second region, and a third region between the first region and the second region;
in response to determining that the detected position is in the first region, operating an instrument supported on a repositionable arm according to a first operating mode;
in response to determining that the detected position is in the third region, providing a haptic barrier to resist movement of the grip input control through the third region; and
in response to determining that the detected position is in the second region, operating the instrument according to a second operating mode different from the first operating mode.

19. The one or more non-transitory machine-readable media of claim 18, wherein:
the grip input control comprises an actuator;
the method further comprises actuating the actuator to provide haptic feedback on the grip input control; and
an amount of haptic feedback in the third region is higher than an amount of haptic feedback in the first region or the second region adjacent to the third region.

20. The one or more non-transitory machine-readable media of claim 18, wherein:
the first direction is a closing direction of the degree of freedom between first and second grip members of the grip input control; and
the haptic barrier is not provided in the third region when the grip input control is being moved in an opening direction of the degree of freedom between the first and second grip members.

* * * * *